United States Patent
Malik et al.

(10) Patent No.: US 11,586,557 B2
(45) Date of Patent: Feb. 21, 2023

(54) DYNAMIC ALLOCATION OF BUFFERS FOR EVICTION PROCEDURES

(71) Applicant: Micron Technology, Inc., Boise, ID (US)

(72) Inventors: Saira Samar Malik, Lafayette, IN (US); Taeksang Song, San Jose, CA (US); Chinnakrishnan Ballapuram, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/395,301

(22) Filed: Aug. 5, 2021

(65) Prior Publication Data
US 2022/0066948 A1 Mar. 3, 2022

Related U.S. Application Data

(60) Provisional application No. 63/070,389, filed on Aug. 26, 2020.

(51) Int. Cl.
*G06F 12/12* (2016.01)
*G06F 12/02* (2006.01)

(52) U.S. Cl.
CPC .......... *G06F 12/12* (2013.01); *G06F 12/0223* (2013.01); *G06F 2212/1044* (2013.01)

(58) Field of Classification Search
None
See application file for complete search history.

(56) References Cited

U.S. PATENT DOCUMENTS

| | | | | |
|---|---|---|---|---|
| 6,134,585 A | * | 10/2000 | Yamato | H04N 21/2393 348/E5.008 |
| 6,799,252 B1 | * | 9/2004 | Bauman | G06F 12/0813 710/316 |
| 7,353,339 B2 | * | 4/2008 | Komarla | G06F 12/0862 711/158 |
| 2003/0018867 A1 | * | 1/2003 | Mora | G06F 13/1673 711/212 |
| 2006/0090036 A1 | * | 4/2006 | Zohar | G06F 12/0866 711/E12.019 |
| 2008/0183903 A1 | * | 7/2008 | VanStee | G06F 13/161 710/5 |
| 2009/0182969 A1 | * | 7/2009 | Norgaard | G06F 13/385 711/170 |
| 2011/0320698 A1 | * | 12/2011 | Wang | G06F 13/1663 711/149 |
| 2016/0335181 A1 | * | 11/2016 | Wang | G06F 3/0604 |
| 2017/0336983 A1 | * | 11/2017 | Roh | G06F 12/128 |

* cited by examiner

*Primary Examiner* — William E. Baughman
(74) *Attorney, Agent, or Firm* — Holland & Hart LLP

(57) ABSTRACT

Methods, systems, and devices for cache management in a memory subsystem are described. A device may determine to perform an eviction procedure for a bank of a volatile memory that operates as a cache for a non-volatile memory. The eviction procedure may save data from the bank of the volatile memory to the non-volatile memory. The device may determine an activity status for at least one buffer in a pool of buffers that are coupled with the volatile memory and the non-volatile memory. The device may select the at least one buffer in the pool of buffers for the eviction procedure for the bank of the volatile memory based at least in part on the activity status for that buffer.

25 Claims, 8 Drawing Sheets

DYNAMIC ALLOCATION OF BUFFERS FOR EVICTION PROCEDURES

CROSS REFERENCE

The present Application for Patent claims the benefit of U.S. Provisional Patent Application No. 63/070,389 by MALIK et al., entitled "DYNAMIC ALLOCATION OF BUFFERS FOR EVICTION PROCEDURES," filed Aug. 26, 2020, assigned to the assignee hereof, and expressly incorporated by reference herein.

BACKGROUND

The following relates generally to one or more memory systems and more specifically dynamic allocation of buffers for eviction procedures.

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

DETAILED DESCRIPTION

A device, such as an electronic device, may include a non-volatile memory that serves as a main memory (e.g., a primary memory for storing information among other operations) and a volatile memory that serves as a cache. Such a configuration may allow the device to benefit from various advantages of non-volatile memory (e.g., non-volatility, high storage capacity, low power consumption) while maintaining compatibility with a host device. In some cases, the device may perform an eviction procedure that saves data from the volatile memory to the non-volatile memory. To accommodate timing inconsistencies between the volatile memory and the non-volatile memory, the device may use an intermediary buffer to transfer the evicted data from the volatile memory to the non-volatile memory. If the volatile memory includes multiple banks, the device may have, for each bank, a respective intermediary buffer for (e.g., dedicated to) that bank.

But such a configuration may prevent the device from being able to efficiently handle eviction procedures that overlap in time for the same bank. For example, the intermediary buffer for the bank may be busy servicing a first eviction procedure for a bank when the device tries to perform a second eviction procedure for the same bank. According to the techniques described herein, a device may efficiently handle overlapping eviction procedures for the same bank by dynamically allocating intermediary buffers for the eviction procedures from a pool of intermediary buffers.

Features of the disclosure are initially described in the context of a memory system and subsystem as described with reference to FIGS. 1 and 2. Features of the disclosure are described in the context of a device and a process flow as described with reference to FIGS. 3 and 4. These and other features of the disclosure are further illustrated by and described with reference to an apparatus diagram and flowcharts that relate to dynamic allocation of buffers for eviction procedures as described with reference to FIGS. 5-7.

Figure 1:
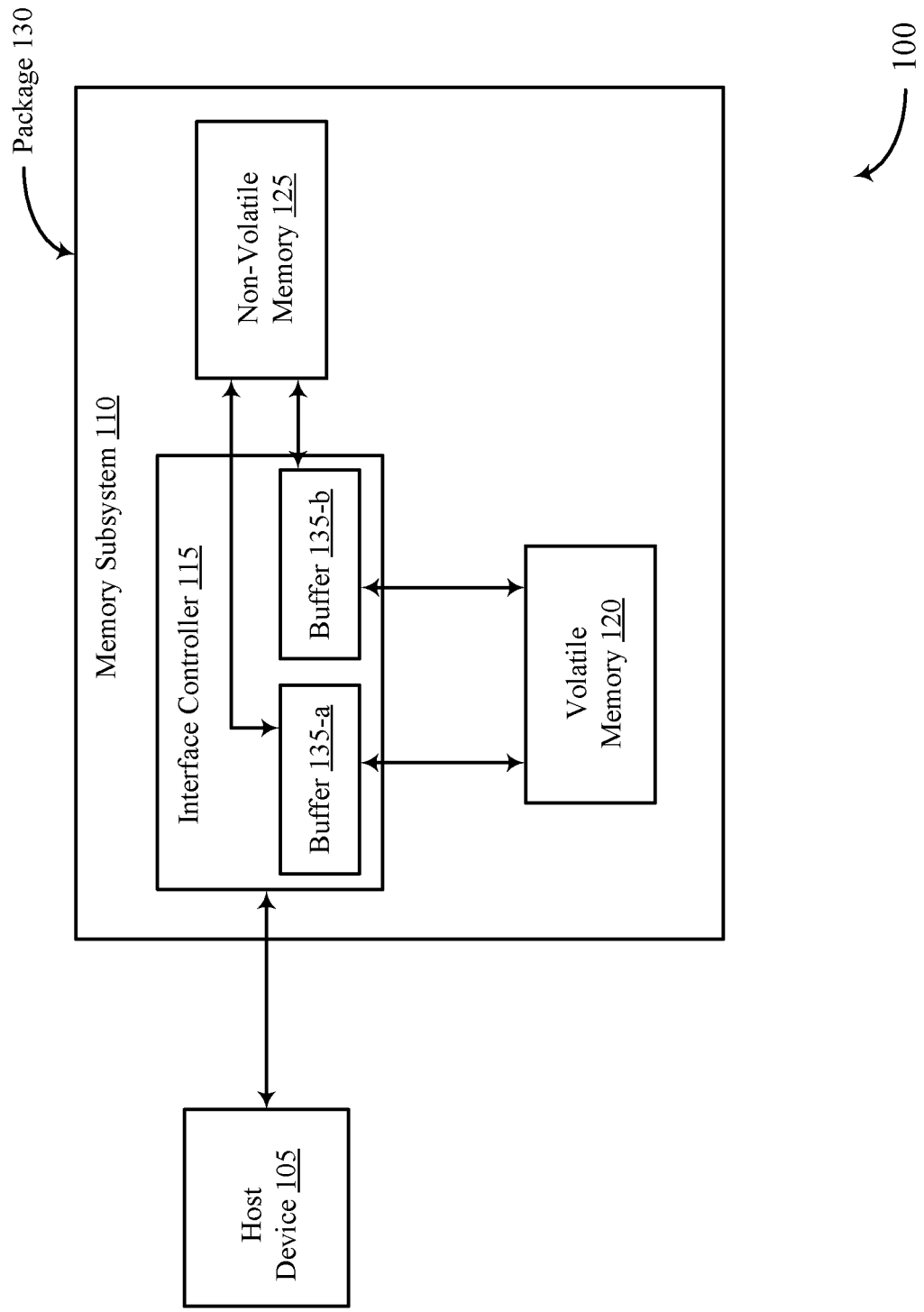
FIG. 1 illustrates an example of a system that supports dynamic allocation of buffers for eviction procedures in accordance with examples as disclosed herein.

FIG. 1 illustrates an example of a memory system 100 that supports dynamic allocation of buffers for eviction procedures in accordance with examples as disclosed herein. The memory system 100 may be included in an electronic device such a computer or phone. The memory system 100 may include a host device 105 and a memory subsystem 110. The host device 105 may be a processor or system-on-a-chip (SoC) that interfaces with the interface controller 115 as well as other components of the electronic device that includes the memory system 100. The memory subsystem 110 may store and provide access to electronic information (e.g., digital information, data) for the host device 105. The memory subsystem 110 may include an interface controller 115, a volatile memory 120, and a non-volatile memory 125. In some examples, the interface controller 115, the volatile memory 120, and the non-volatile memory 125 may be included in a same physical package such as a package 130. However, the interface controller 115, the volatile memory 120, and the non-volatile memory 125 may be disposed on different, respective dies (e.g., silicon dies).

The devices in the memory system 100 may be coupled by various conductive lines (e.g., traces, printed circuit board (PCB) routing, redistribution layer (RDL) routing) that may enable the communication of information (e.g., commands, addresses, data) between the devices. The conductive lines may make up channels, data buses, command buses, address buses, and the like.

The memory subsystem 110 may be configured to provide the benefits of the non-volatile memory 125 while maintaining compatibility with a host device 105 that supports protocols for a different type of memory, such as the volatile memory 120, among other examples. For example, the non-volatile memory 125 may provide benefits (e.g., relative to the volatile memory 120) such as non-volatility, higher capacity, or lower power consumption. But the host device 105 may be incompatible or inefficiently configured with various aspects of the non-volatile memory 125. For instance, the host device 105 may support voltages, access latencies, protocols, page sizes, etc. that are incompatible with the non-volatile memory 125. To compensate for the incompatibility between the host device 105 and the non-volatile memory 125, the memory subsystem 110 may be configured with the volatile memory 120, which may be compatible with the host device 105 and serve as a cache for the non-volatile memory 125. Thus, the host device 105 may use protocols supported by the volatile memory 120 while benefitting from the advantages of the non-volatile memory 125.

In some examples, the memory system 100 may be included in, or coupled with, a computing device, electronic device, mobile computing device, or wireless device. The device may be a portable electronic device. For example, the device may be a computer, a laptop computer, a tablet computer, a smartphone, a cellular phone, a wearable device, an internet-connected device, or the like. In some examples, the device may be configured for bi-directional wireless communication via a base station or access point. In some examples, the device associated with the memory system 100 may be capable of machine-type communication (MTC), machine-to-machine (M2M) communication, or device-to-device (D2D) communication. In some examples, the device associated with the memory system 100 may be referred to as a user equipment (UE), station (STA), mobile terminal, or the like.

The host device 105 may be configured to interface with the memory subsystem 110 using a first protocol (e.g., low-power double data rate (LPDDR)) supported by the interface controller 115. Thus, the host device 105 may, in some examples, interface with the interface controller 115 directly and the non-volatile memory 125 and the volatile memory 120 indirectly. In alternative examples, the host device 105 may interface directly with the non-volatile memory 125 and the volatile memory 120. The host device 105 may also interface with other components of the electronic device that includes the memory system 100. The host device 105 may be or include an SoC, a general-purpose processor, a digital signal processor (DSP), an application-specific integrated circuit (ASIC), a field-programmable gate array (FPGA) or other programmable logic device, discrete gate or transistor logic, discrete hardware components, or it may be a combination of these types of components. In some examples, the host device 105 may be referred to as a host.

The interface controller 115 may be configured to interface with the volatile memory 120 and the non-volatile memory 125 on behalf of the host device 105 (e.g., based on one or more commands or requests issued by the host device 105). For instance, the interface controller 115 may facilitate the retrieval and storage of data in the volatile memory 120 and the non-volatile memory 125 on behalf of the host device 105. Thus, the interface controller 115 may facilitate data transfer between various subcomponents, such as between at least some of the host device 105, the volatile memory 120, or the non-volatile memory 125. The interface controller 115 may interface with the host device 105 and the volatile memory 120 using the first protocol and may interface with the non-volatile memory 125 using a second protocol supported by the non-volatile memory 125.

The non-volatile memory 125 may be configured to store digital information (e.g., data) for the electronic device that includes the memory system 100. Accordingly, the non-volatile memory 125 may include an array or arrays of memory cells and a local memory controller configured to operate the array(s) of memory cells. In some examples, the memory cells may be or include FeRAM cells (e.g., the non-volatile memory 125 may be FeRAM). The non-volatile memory 125 may be configured to interface with the interface controller 115 using the second protocol that is different than the first protocol used between the interface controller 115 and the host device 105. In some examples, the non-volatile memory 125 may have a longer latency for access operations than the volatile memory 120. For example, retrieving data from the non-volatile memory 125 may take longer than retrieving data from the volatile memory 120. Similarly, writing data to the non-volatile memory 125 may take longer than writing data to the volatile memory 120. In some examples, the non-volatile memory 125 may have a smaller page size than the volatile memory 120, as described herein.

The volatile memory 120 may be configured to operate as a cache for one or more components, such as the non-volatile memory 125. For example, the volatile memory 120 may store information (e.g., data) for the electronic device that includes the memory system 100. Accordingly, the volatile memory 120 may include an array or arrays of memory cells and a local memory controller configured to operate the array(s) of memory cells. In some examples, the memory cells may be or include DRAM cells (e.g., the volatile memory may be DRAM). The non-volatile memory 125 may be configured to interface with the interface controller 115 using the first protocol that is used between the interface controller 115 and the host device 105.

In some examples, the volatile memory 120 may have a shorter latency for access operations than the non-volatile memory 125. For example, retrieving data from the volatile memory 120 may take less time than retrieving data from the non-volatile memory 125. Similarly, writing data to the volatile memory 120 may take less time than writing data to the non-volatile memory 125. In some examples, the volatile memory 120 may have a larger page size than the non-volatile memory 125. For instance, the page size of volatile memory 120 may be 2 kilobytes (2 kB) and the page size of non-volatile memory 125 may be 64 bytes (64 B) or 128 bytes (128 B).

Although the non-volatile memory 125 may be a higher-density memory than the volatile memory 120, accessing the non-volatile memory 125 may take longer than accessing the volatile memory 120 (e.g., due to different architectures and protocols, among other reasons). Accordingly, operating the volatile memory 120 as a cache may reduce latency in the memory system 100. As an example, an access request for data from the host device 105 may be satisfied relatively quickly by retrieving the data from the volatile memory 120 rather than from the non-volatile memory 125. To facilitate operation of the volatile memory 120 as a cache, the interface controller 115 may include multiple buffers 135. The buffers 135 may be disposed on the same die as the interface controller 115 and may be configured to temporarily store data for transfer between the volatile memory 120, the non-volatile memory 125, or the host device 105 (or any combination thereof) during one or more access operations (e.g., storage and retrieval operations).

An access operation may also be referred to as an access process or access procedure and may involve one or more sub-operations that are performed by one or more of the components of the memory subsystem 110. Examples of access operations may include storage operations in which data provided by the host device 105 is stored (e.g., written to) in the volatile memory 120 or the non-volatile memory 125 (or both), and retrieval operations in which data requested by the host device 105 is obtained (e.g., read) from the volatile memory 120 or the non-volatile memory 125 and is returned to the host device 105.

To store data in the memory subsystem 110, the host device 105 may initiate a storage operation (or "storage process") by transmitting a storage command (also referred to as a storage request, a write command, or a write request) to the interface controller 115. The storage command may target a set of non-volatile memory cells in the non-volatile memory 125. In some examples, a set of memory cells may also be referred to as a portion of memory. The host device 105 may also provide the data to be written to the set of non-volatile memory cells to the interface controller 115. The interface controller 115 may temporarily store the data in the buffer 135-a. After storing the data in the buffer 135-a, the interface controller 115 may transfer the data from the buffer 135-a to the volatile memory 120 or the non-volatile memory 125 or both. In write-through mode, the interface controller 115 may transfer the data to both the volatile memory 120 and the non-volatile memory 125. In write-back mode, the interface controller 115 may only transfer the data to the volatile memory 120.

In either mode, the interface controller 115 may identify an appropriate set of one or more volatile memory cells in the volatile memory 120 for storing the data associated with the storage command. To do so, the interface controller 115 may implement set-associative mapping in which each set (e.g., block) of one or more non-volatile memory cells in the non-volatile memory 125 may be mapped to multiple sets of volatile memory cells in the volatile memory 120. For instance, the interface controller 115 may implement n-way associative mapping which allows data from a set of non-volatile memory cells to be stored in one of n sets of volatile memory cells in the volatile memory 120. Thus, the interface controller 115 may manage the volatile memory 120 as a cache for the non-volatile memory 125 by referencing the n sets of volatile memory cells associated with a targeted set of non-volatile memory cells. As used herein, a "set" of objects may refer to one or more of the objects unless otherwise described or noted. Although described with reference to set-associative mapping, the interface controller 115 may manage the volatile memory 120 as a cache by implementing one or more other types of mapping such as direct mapping or associative mapping, among other examples.

After determining which n sets of volatile memory cells are associated with the targeted set of non-volatile memory cells, the interface controller 115 may store the data in one or more of the n sets of volatile memory cells. This way, a subsequent retrieval command from the host device 105 for the data can be efficiently satisfied by retrieving the data from the lower-latency volatile memory 120 instead of retrieving the data from the higher-latency non-volatile memory 125. The interface controller 115 may determine which of the n sets of the volatile memory 120 to store the data based on one or more parameters associated with the data stored in the n sets of the volatile memory 120, such as the validity, age, or modification status of the data. Thus, a storage command by the host device 105 may be wholly (e.g., in write-back mode) or partially (e.g., in write-through mode) satisfied by storing the data in the volatile memory 120. To track the data stored in the volatile memory 120, the interface controller 115 may store for one or more sets of volatile memory cells (e.g., for each set of volatile memory cells) a tag address that indicates the non-volatile memory cells with data stored in a given set of volatile memory cells.

To retrieve data from the memory subsystem 110, the host device 105 may initiate a retrieval operation (also referred to as a retrieval process) by transmitting a retrieval command (also referred to as a retrieval request, a read command, or a read request) to the interface controller 115. The retrieval command may target a set of one or more non-volatile memory cells in the non-volatile memory 125. Upon receiving the retrieval command, the interface controller 115 may check for the requested data in the volatile memory 120. For instance, the interface controller 115 may check for the requested data in the n sets of volatile memory cells associated with the targeted set of non-volatile memory cells. If one of the n sets of volatile memory cells stores the requested data (e.g., stores data for the targeted set of non-volatile memory cells), the interface controller 115 may transfer the data from the volatile memory 120 to the buffer 135-a (e.g., in response to determining that one of the n sets of volatile memory cells stores the requested data, as described in FIGS. 4 and 5) so that it can be transmitted to the host device 105. The term "hit" may be used to refer to the scenario where the volatile memory 120 stores data requested by the host device 105. If the n sets of one or more volatile memory cells do not store the requested data (e.g., the n sets of volatile memory cells store data for a set of non-volatile memory cells other than the targeted set of non-volatile memory cells), the interface controller 115 may transfer the requested data from the non-volatile memory 125 to the buffer 135-a (e.g., in response to determining that the n sets of volatile memory cells do not store the requested data, as described with reference to FIGS. 4 and 5) so that it can be transmitted to the host device 105. The term "miss" may be used to refer to the scenario where the volatile memory 120 does not store data requested by the host device 105.

In a miss scenario, after transferring the requested data to the buffer 135-a, the interface controller 115 may transfer the requested data from the buffer 135-a to the volatile memory 120 so that subsequent read requests for the data can be satisfied by the volatile memory 120 instead of the non-volatile memory 125. For example, the interface controller 115 may store the data in one of the n sets of volatile memory cells associated with the targeted set of non-volatile memory cells. But the n sets of volatile memory cells may already be storing data for other sets of non-volatile memory cells. So, to preserve this other data, the interface controller 115 may transfer the other data to the buffer 135-b so that it can be transferred to the non-volatile memory 125 for storage. Such a process or procedure may be referred to as "eviction" and the data transferred from the volatile memory 120 to the buffer 135-b may be referred to as "victim" or "evicted" data. In some cases, the interface controller 115 may transfer a subset of the victim data from the buffer 135-b to the non-volatile memory 125. For example, the interface controller 115 may transfer one or more subsets of victim data that have changed since the data was initially stored in the non-volatile memory 125. Data that is inconsistent between the volatile memory 120 and the non-volatile memory 125 (e.g., due to an update in one memory and not the other) may be referred to in some cases as "modified" or "dirty" data. In some examples (e.g., when interface controller operates in one mode such as a write-back mode), dirty data may be data that is present in the volatile memory 120 but not present in the non-volatile memory 125.

Thus, the memory subsystem 110 may perform an eviction procedure that saves data from a row of the volatile memory 120 to the non-volatile memory 125 so that the row can be filled with new data. To accommodate timing inconsistencies between the volatile memory 120 and the non-volatile memory 125, among other aspects, the memory subsystem 110 may use an intermediary buffer, such as buffer 135-b, to communicate the victim data from the volatile memory 120 to the non-volatile memory 125. The buffer 135-b may be dynamically selected from a pool of buffers for (e.g., dedicated to) eviction procedures. The ability to dynamically allocate buffers from pool for different eviction procedures may provide distinct advantages, for example, when multiple eviction procedures for a bank overlap in time. For example, dynamic allocation of buffers may allow multiple eviction procedures for a bank to be performed in parallel, rather than serially, which may reduce latency, among other distinct advantages.

Figure 2:
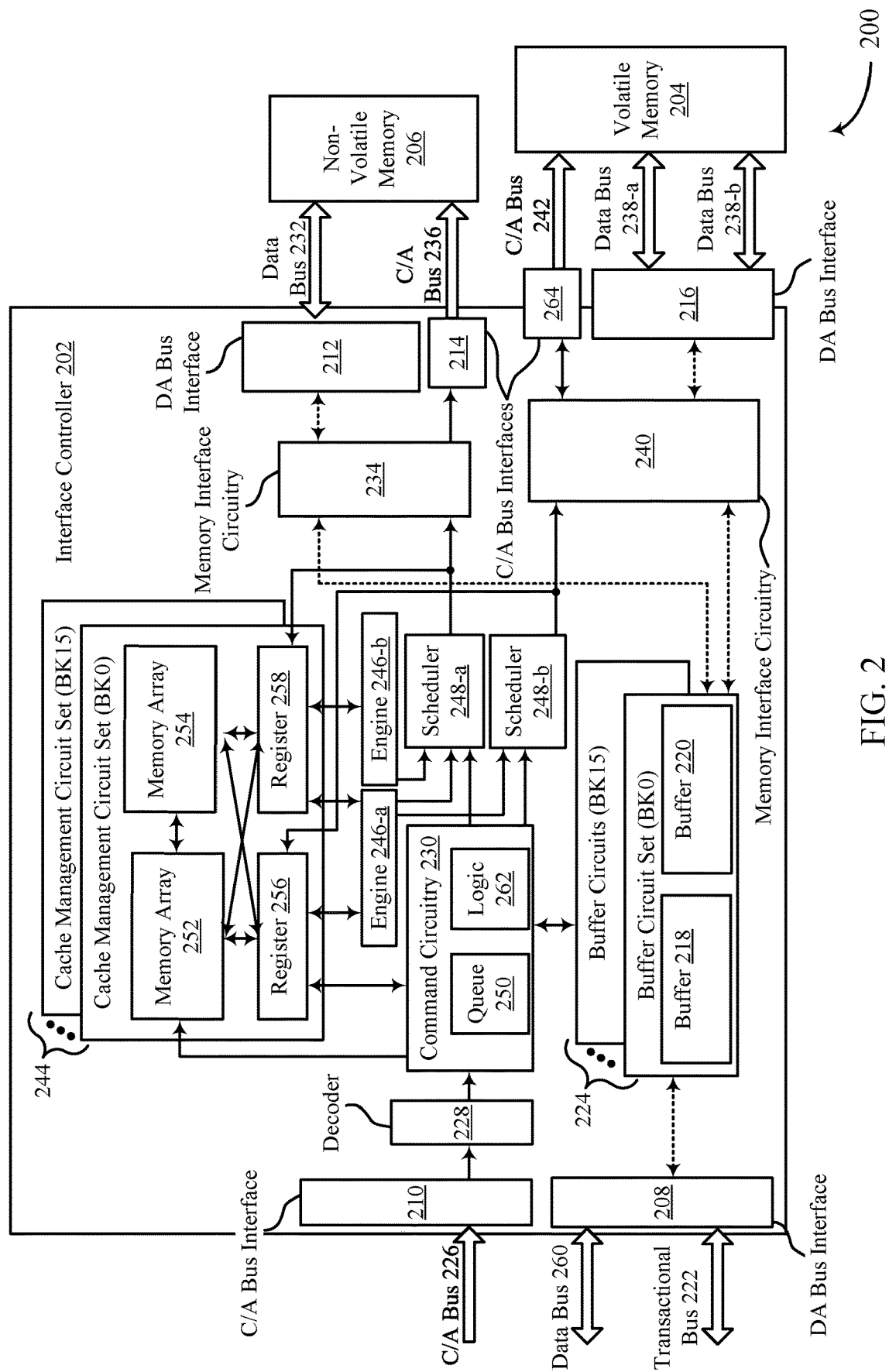
FIG. 2 illustrates an example of a memory subsystem that supports dynamic allocation of buffers for eviction procedures in accordance with examples as disclosed herein.

FIG. 2 illustrates an example of a memory subsystem 200 that supports dynamic allocation of buffers for eviction procedures in accordance with examples as disclosed herein. The memory subsystem 200 may be an example of the memory subsystem 110 described with reference to FIG. 1. Accordingly, the memory subsystem 200 may interact with a host device as described with reference to FIG. 1. The memory subsystem 200 may include an interface controller 202, a volatile memory 204, and a non-volatile memory 206, which may be examples of the interface controller 115, the volatile memory 120, and the non-volatile memory 125, respectively, as described with reference to FIG. 1. Thus, the interface controller 202 may interface with the volatile memory 204 and the non-volatile memory 206 on behalf of the host device as described with reference to FIG. 1. For example, the interface controller 202 may operate the volatile memory 204 as a cache for the non-volatile memory 206. Operating the volatile memory 204 as the cache may allow subsystem to provide the benefits of the non-volatile memory 206 (e.g., non-volatile, high-density storage) while maintaining compatibility with a host device that supports a different protocol than the non-volatile memory 206.

In FIG. 2, dashed lines between components represent the flow of data or communication paths for data and solid lines between components represent the flow of commands or communication paths for commands. In some cases, the memory subsystem 200 is one of multiple similar or identical subsystems that may be included in an electronic device. Each subsystem may be referred to as a slice and may be associated with a respective channel of a host device in some examples.

The non-volatile memory 206 may be configured to operate as a main memory (e.g., memory for long-term data storage) for a host device. In some cases, the non-volatile memory 206 may include one or more arrays of FeRAM cells. Each FeRAM cell may include a selection component and a ferroelectric capacitor and may be accessed by applying appropriate voltages to one or more access lines such as word lines, plates lines, and digit lines. In some examples, a subset of FeRAM cells coupled with to an activated word line may be sensed, for example concurrently or simultaneously, without having to sense all FeRAM cells coupled with the activated word line. Accordingly, a page size for an FeRAM array may be different than (e.g., smaller than) a DRAM page size. In the context of a memory device, a page may refer to the memory cells in a row (e.g., a group of the memory cells that have a common row address) and a page size may refer to the number of memory cells or column addresses in a row, or the number of column addresses accessed during an access operation. Alternatively, a page size may refer to a size of data handled by various interfaces. In some cases, different memory device types may have different page sizes. For example, a DRAM page size (e.g., 2 kB) may be a superset of a non-volatile memory (e.g., FeRAM) page size (e.g., 64 B).

A smaller page size of an FeRAM array may provide various efficiency benefits, as an individual FeRAM cell may require more power to read or write than an individual DRAM cell. For example, a smaller page size for an FeRAM array may facilitate effective energy usage because a smaller number of FeRAM cells may be activated when an associated change in information is minor. In some examples, the page size for an array of FeRAM cells may vary, for example dynamically (e.g., during operation of the array of FeRAM cells) depending on the nature of data and command utilizing FeRAM operation.

Although an individual FeRAM cell may require more power to read or write than an individual DRAM cell, an FeRAM cell may maintain its stored logic state for an extended period of time in the absence of an external power source, as the ferroelectric material in the FeRAM cell may maintain a non-zero electric polarization in the absence of an electric field. Therefore, including an FeRAM array in the non-volatile memory 206 may provide efficiency benefits relative to volatile memory cells (e.g., DRAM cells in the volatile memory 204), as it may reduce or eliminate requirements to perform refresh operations.

The volatile memory 204 may be configured to operate as a cache for the non-volatile memory 206. In some cases, the volatile memory 204 may include one or more arrays of DRAM cells. Each DRAM cell may include a capacitor that includes a dielectric material to store a charge representative of the programmable state. The memory cells of the volatile memory 204 may be logically grouped or arranged into one or more memory banks (as referred to herein as "banks"). For example, volatile memory 204 may include sixteen banks. The memory cells of a bank may be arranged in a grid or an array of intersecting columns and rows and each memory cell may be accessed or refreshed by applying appropriate voltages to the digit line (e.g., column line) and word line (e.g., row line) for that memory cell. The rows of a bank may be referred to pages, and the page size may refer to the number of columns or memory cells in a row. As noted, the page size of the volatile memory 204 may be different than (e.g., larger than) the page size of the non-volatile memory 206.

The interface controller 202 may include various circuits for interfacing (e.g., communicating) with other devices, such as a host device, the volatile memory 204, and the non-volatile memory 206. For example, the interface controller 202 may include a data (DA) bus interface 208, a command and address (C/A) bus interface 210, a data bus interface 212, a C/A bus interface 214, a data bus interface 216, and a C/A bus interface 264. The data bus interfaces may support the communication of information using one or more communication protocols. For example, the data bus interface 208, the C/A bus interface 210, the data bus interface 216, and the C/A bus interface 264 may support information that is communicated using a first protocol (e.g., LPDDR signaling), whereas the data bus interface 212 and the C/A bus interface 214 may support information communicated using a second protocol. Thus, the various bus interfaces coupled with the interface controller 202 may support different amounts of data or data rates.

The data bus interface 208 may be coupled with the data bus 260, the transactional bus 222, and the buffer circuitry 224. The data bus interface 208 may be configured to transmit and receive data over the data bus 260 and control information (e.g., acknowledgements/negative acknowledgements) or metadata over the transactional bus 222. The data bus interface 208 may also be configured to transfer data between the data bus 260 and the buffer circuitry 224. The data bus 260 and the transactional bus 222 may be coupled with the interface controller 202 and the host device such that a conductive path is established between the interface controller 202 and the host device. In some examples, the pins of the transactional bus 222 may be referred to as data mask inversion (DMI) pins. Although shown with one data bus 260 and one transactional bus 222, there may be any number of data buses 260 and any number of transactional buses 222 coupled with one or more data bus interfaces 208.

The C/A bus interface 210 may be coupled with the C/A bus 226 and the decoder 228. The C/A bus interface 210 may be configured to transmit and receive commands and addresses over the C/A bus 226. The commands and addresses received over the C/A bus 226 may be associated with data received or transmitted over the data bus 260. The C/A bus interface 210 may also be configured to transmit commands and addresses to the decoder 228 so that the decoder 228 can decode the commands and relay the decoded commands and associated addresses to the command circuitry 230.

The data bus interface 212 may be coupled with the data bus 232 and the memory interface circuitry 234. The data bus interface 212 may be configured to transmit and receive data over the data bus 232, which may be coupled with the non-volatile memory 206. The data bus interface 212 may also be configured to transfer data between the data bus 232 and the memory interface circuitry 234. The C/A bus interface 214 may be coupled with the C/A bus 236 and the memory interface circuitry 234. The C/A bus interface 214 may be configured to receive commands and addresses from the memory interface circuitry 234 and relay the commands and the addresses to the non-volatile memory 206 (e.g., to a local controller of the non-volatile memory 206) over the C/A bus 236. The commands and the addresses transmitted over the C/A bus 236 may be associated with data received or transmitted over the data bus 232. The data bus 232 and the C/A bus 236 may be coupled with the interface controller 202 and the non-volatile memory 206 such that conductive paths are established between the interface controller 202 and the non-volatile memory 206.

The data bus interface 216 may be coupled with the data buses 238 and the memory interface circuitry 240. The data bus interface 216 may be configured to transmit and receive data over the data buses 238, which may be coupled with the volatile memory 204. The data bus interface 216 may also be configured to transfer data between the data buses 238 and the memory interface circuitry 240. The C/A bus interface 264 may be coupled with the C/A bus 242 and the memory interface circuitry 240. The C/A bus interface 264 may be configured to receive commands and addresses from the memory interface circuitry 240 and relay the commands and the addresses to the volatile memory 204 (e.g., to a local controller of the volatile memory 204) over the C/A bus 242. The commands and addresses transmitted over the C/A bus 242 may be associated with data received or transmitted over the data buses 238. The data bus 238 and the C/A bus 242 may be coupled with the interface controller 202 and the volatile memory 204 such that conductive paths are established between the interface controller 202 and the volatile memory 204.

In addition to buses and bus interfaces for communicating with coupled devices, the interface controller 202 may include circuitry for operating the non-volatile memory 206 as a main memory and the volatile memory 204 as a cache. For example, the interface controller 202 may include command circuitry 230, buffer circuitry 224, cache management circuitry 244, one or more engines 246, and one or more schedulers 248.

The command circuitry 230 may be coupled with the buffer circuitry 224, the decoder 228, the cache management circuitry 244, and the schedulers 248, among other components. The command circuitry 230 may be configured to receive command and address information from the decoder 228 and store the command and address information in the queue 250. The command circuitry 230 may include logic 262 that processes command information (e.g., from a host device) and storage information from other components (e.g., the cache management circuitry 244, the buffer circuitry 224) and uses that information to generate one or more commands for the schedulers 248. The command circuitry 230 may also be configured to transfer address information (e.g., address bits) to the cache management circuitry 244. In some examples, the logic 26 2522 may be a circuit configured to operate as a finite state machine (FSM).

The buffer circuitry 224 may be coupled with the data bus interface 208, the command circuitry 230, the memory interface circuitry 234, and the memory interface circuitry 234. The buffer circuitry 224 may include a set of one or more buffer circuits for at least some banks, if not each bank, of the volatile memory 204. The buffer circuitry 224 may also include components (e.g., a memory controller) for accessing the buffer circuits. In one example, the volatile memory 204 may include sixteen banks and the buffer circuitry 224 may include sixteen sets of buffer circuits. Each set of buffer circuits may include a respective buffer 218 and a respective buffer 220. of the buffer 218 in each buffer circuit set may be configured to store data from or for (or both) a respective bank of the volatile memory 204. As an example, the buffer 218 in the circuit set for bank 0 (BK0) may be configured to store data from or for (or both) the first bank of the volatile memory 204 and the buffer circuit 218 in the circuit set for bank 15 (BK15) may be configured to store data from or for (or both) the sixteenth bank of the volatile memory 204. According to the techniques described herein, however, buffers 220 may be used for data from any bank of the volatile memory 204, regardless of the circuit set. Thus, the buffers 220 may form a pool of buffers that can be dynamically allocated to different banks of the volatile memory 204, which may provide the distinct advantages described herein.

Each set of buffer circuits in the buffer circuitry 224 may include a pair of buffers. The pair of buffers may include one buffer (e.g., an open page data (OPD) buffer) configured to store data targeted by an access command (e.g., a storage command or retrieval command) from the host device and another buffer (e.g., a victim page data (VPD) buffer) configured to store data for an eviction process that results from the access command. For example, the buffer circuit set for BK0 may include the buffer 218 and the buffer 220, which may be examples of buffer 135-a and 135-b, respectively. The buffer 218 may be configured to store BK0 data that is targeted by an access command from the host device. And the buffer 220 may be configured to store data that is transferred from BK0 (or another bank) as part of an eviction process triggered by the access command. Each buffer in a buffer circuit set may be configured with a size (e.g., storage capacity) that corresponds to a page size of the volatile memory 204. For example, if the page size of the volatile memory 204 is 2 kB, the size of each buffer may be 2 kB. Thus, the size of the buffer may be equivalent to the page size of the volatile memory 204 in some examples.

The cache management circuitry 244 may be coupled with the command circuitry 230, the engines 246, and the schedulers 248, among other components. The cache management circuitry 244 may include a cache management circuit set for one or more banks (e.g., each bank) of volatile memory. As an example, the cache management circuitry 244 may include sixteen cache management circuit sets for BK0 through BK15. Each cache management circuit set may include two memory arrays that may be configured to store storage information for the volatile memory 204. As an example, the cache management circuit set for BK0 may include a memory array 252 (e.g., a CDRAM Tag Array (CDT-TA)) and a memory array 254 (e.g., a CDRAM Valid (CDT-V) array), which may be configured to store storage information for BK0. The memory arrays may also be referred to as arrays or buffers in some examples. In some cases, the memory arrays may be or include volatile memory cells, such as SRAM cells.

Storage information may include content information, validity information, or dirty information (or any combination thereof) associated with the volatile memory 204. Content information (which may also be referred to as tag information or address information) may indicate which data is stored in a set (e.g., row) of volatile memory cells. For example, the content information (e.g., a tag address) for a set of one or more volatile memory cells may indicate which set of one or more non-volatile memory cells currently has data stored in the set of one or more volatile memory cells. Validity information may indicate whether the data stored in a set of volatile memory cells is actual data (e.g., data having an intended order or form) or placeholder data (e.g., data being random or dummy, not having an intended or important order). And dirty information may indicate whether the data stored in a set of one or more volatile memory cells of the volatile memory 204 is different than corresponding data stored in a set of one or more non-volatile memory cells of the non-volatile memory 206. For example, dirty information may indicate whether data stored in a set of volatile memory cells has been updated relative to data stored in the non-volatile memory 206.

The memory array 252 may include memory cells that store storage information (e.g., content and validity information) for an associated bank (e.g., BK0) of the volatile memory 204. The storage information may be stored on a per-page basis (e.g., there may be respective storage information for each page of the associated non-volatile memory bank). The interface controller 202 may check for requested data in the volatile memory 204 by referencing the storage information in the memory array 252. For instance, the interface controller 202 may receive, from a host device, a retrieval command for data in a set of non-volatile memory cells in the non-volatile memory 206. The interface controller 202 may use a set of one or more address bits (e.g., a set of row address bits) targeted by the access request to reference the storage information in the memory array 252. For instance, using set-associative mapping, the interface controller 202 may reference the content information in the memory array 252 to determine which set of volatile memory cells, if any, stores the requested data.

In addition to storing content information for volatile memory cells, the memory array 252 may also store validity information that indicates whether the data in a set of volatile memory cells is actual data (also referred to as valid data) or random data (also referred to as invalid data). For example, the volatile memory cells in the volatile memory 204 may initially store random data and continue to do so until the volatile memory cells are written with data from a host device or the non-volatile memory 206. To track which data is valid, the memory array 252 may be configured to set a bit for each set of volatile memory cells when actual data is stored in that set of volatile memory cells. This bit may be referred to a validity bit or a validity flag. As with the content information, the validity information stored in the memory array 252 may be stored on a per-page basis. Thus, each validity bit may indicate the validity of data stored in an associated page in some examples.

The memory array 254 may be similar to the memory array 252 and may also include memory cells that store validity information for a bank (e.g., BK0) of the volatile memory 204 that is associated with the memory array 252. However, the validity information stored in the memory array 254 may be stored on a sub-block basis as opposed to a per-page basis for the memory array 252. For example, the validity information stored in the memory cells of the memory array 254 may indicate the validity of data for subsets of volatile memory cells in a set (e.g., page) of volatile memory cells. As an example, the validity information in the memory array 254 may indicate the validity of each subset (e.g., 64B) of data in a page of data stored in BK0 of the volatile memory 204. Storing content information and validity information on a per-page basis in the memory array 252 may allow the interface controller 202 to quickly and efficiently determine whether there is a hit or miss for data in the volatile memory 204. Storing validity information on a sub-block basis may allow the interface controller 202 to determine which subsets of data to preserve in the non-volatile memory 206 during an eviction process.

Each cache management circuit set may also include a respective pair of registers coupled with the command circuitry 230, the engines 246, the memory interface circuitry 234, the memory interface circuitry 240, and the memory arrays for that cache management circuit set, among other components. For example, a cache management circuit set may include a first register (e.g., a register 256 which may be an open page tag (OPT) register) configured to receive storage information (e.g., one or more bits of tag information, validity information, or dirty information) from the memory array 252 or the scheduler 248-*b* or both. The cache management circuitry set may also include a second register (e.g., a register 258 which may be a victim page tag (VPT) register) configured to receive storage information from the memory array 254 and the scheduler 248-*a* or both. The information in the register 256 and the register 258 may be transferred to the command circuitry 230 and the engines 246 to enable decision-making by these components. For example, the command circuitry 230 may issue commands for reading the non-volatile memory 206 or the volatile memory 204 based on content information from the register 256.

The engine 246-*a* may be coupled with the register 256, the register 258, and the schedulers 248. The engine 246-*a* may be configured to receive storage information from various components and issue commands to the schedulers 248 based on the storage information. For example, when the interface controller 202 is in a first mode such as a write-through mode, the engine 246-*a* may issue commands to the scheduler 248-*b* and in response the scheduler 248-*b* to initiate or facilitate the transfer of data from the buffer 218 to both the volatile memory 204 and the non-volatile memory 206. Alternatively, when the interface controller 202 is in a second mode such as a write-back mode, the engine 246-*a* may issue commands to the scheduler 248-*b* and in response the scheduler 248-*b* may initiate or facilitate the transfer of data from the buffer 218 to the volatile memory 204. In the event of a write-back operation, the data stored in the volatile memory 204 may eventually be transferred to the non-volatile memory 206 during a subsequent eviction process.

The engine 246-*b* may be coupled with the register 258 and the scheduler 248-*a*, among other components. The engine 246-*b* may be configured to receive storage information from the register 258 (and/or from other components) and issue commands or requests to the scheduler 248-*a* based on the storage information. For instance, the engine 246-*b* may issue commands to the scheduler 248-*a* to initiate or facilitate transfer of dirty data from the buffer 220 to the non-volatile memory 206 (e.g., as part of an eviction process). If the buffer 220 holds a set of data transferred from the volatile memory 204 (e.g., victim data), the engine 246-*b* may indicate which one or more subsets (e.g., which 64 B) of the set of data in the buffer 220 should be transferred to the non-volatile memory 206.

The scheduler 248-*a* may be coupled with various components of the interface controller 202 and may facilitate accessing the non-volatile memory 206 by issuing commands to the memory interface circuitry 234. The commands issued by the scheduler 248-*a* may be based on commands from the command circuitry 230, the engine 246-*a*, the engine 246-*b*, or a combination of these components. Similarly, the scheduler 248-*b* may be coupled with various components of the interface controller 202 and may facilitate accessing the volatile memory 204 by issuing commands to the memory interface circuitry 240. The commands issued by the scheduler 248-*b* may be based on commands from the command circuitry 230 or the engine 246-*a*, or both.

The memory interface circuitry 234 may communicate with the non-volatile memory 206 via one or more of the data bus interface 212 and the C/A bus interface 214. For example, the memory interface circuitry 234 may prompt the C/A bus interface 214 to relay commands issued by the memory interface circuitry 234 over the C/A bus 236 to a local controller in the non-volatile memory 206. And the memory interface circuitry 234 may transmit to, or receive data from, the non-volatile memory 206 over the data bus 232. In some examples, the commands issued by the memory interface circuitry 234 may be supported by the non-volatile memory 206 but not the volatile memory 204 (e.g., the commands issued by the memory interface circuitry 234 may be different than the commands issued by the memory interface circuitry 240).

The memory interface circuitry 240 may communicate with the volatile memory 204 via one or more of the data bus interface 216 and the C/A bus interface 264. For example, the memory interface circuitry 240 may prompt the C/A bus interface 264 to relay commands issued by the memory interface circuitry 240 over the C/A bus 242 to a local controller of the volatile memory 204. And the memory interface circuitry 240 may transmit to, or receive data from, the volatile memory 204 over one or more data buses 238.

In some examples, the commands issued by the memory interface circuitry 240 may be supported by the volatile memory 204 but not the non-volatile memory 206 (e.g., the commands issued by the memory interface circuitry 240 may be different than the commands issued by the memory interface circuitry 234).

Together, the components of the interface controller 202 may operate the non-volatile memory 206 as a main memory and the volatile memory 204 as a cache. Such operation may be prompted by one or more access commands (e.g., read/retrieval commands/requests and write/storage commands/requests) received from a host device.

In some examples, the interface controller 202 may receive a storage command from the host device. The storage command may be received over the C/A bus 226 and transferred to the command circuitry 230 via one or more of the C/A bus interface 210 and the decoder 228. The storage command may include or be accompanied by address bits that target a memory address of the non-volatile memory 206. The data to be stored may be received over the data bus 260 and transferred to the buffer 218 via the data bus interface 208. In a write-through mode, the interface controller 202 may transfer the data to both the non-volatile memory 206 and the volatile memory 204. In a write-back mode, the interface controller 202 may transfer the data to only the volatile memory 204. In either mode, the interface controller 202 may first check to see if the volatile memory 204 has memory cells available to store the data. To do so, the command circuitry 230 may reference the memory array 252 (e.g., using a set of the memory address bits) to determine whether one or more of the n sets (e.g., rows) of volatile memory cells associated with the memory address are empty (e.g., store random or invalid data). In some cases, a set of volatile memory cells in the volatile memory 204 may be referred to as a row, line or cache line.

If one of then associated sets (e.g., rows) of volatile memory cells is available for storing information, the interface controller 202 may transfer the data from the buffer 218 to the volatile memory 204 for storage in that set of volatile memory cells. But if no associated sets of volatile memory cells are empty, the interface controller 202 may initiate an eviction process to make room for the data in the volatile memory 204. The eviction process may involve transferring the old data (e.g., existing data) in one of the n associated sets of volatile memory cells to the buffer 220. The dirty information for the old data may also be transferred to the memory array 254 or register 258 for identification of dirty subsets of the old data. After the old data is stored in the buffer 220, the new data can be transferred from the buffer 218 to the volatile memory 204 and the old data can be transferred from the buffer 220 to the non-volatile memory 206. In some cases, dirty subsets of the old data are transferred to the non-volatile memory 206 and clean subsets (e.g., unmodified subsets) are discarded. The dirty subsets may be identified by the engine 246-*b* based on dirty information transferred (e.g., from the volatile memory 204) to the memory array 254 or register 258 during the eviction process.

In another example, the interface controller 202 may receive a retrieval command from the host device. The retrieval command may be received over the C/A bus 226 and transferred to the command circuitry 230 via one or more of the C/A bus interface 210 and the decoder 228. The retrieval command may include address bits that target a memory address of the non-volatile memory 206. Before attempting to access the targeted memory address of the non-volatile memory 206, the interface controller 202 may check to see if the volatile memory 204 stores the data. To do so, the command circuitry 230 may reference the memory array 252 (e.g., using a set of the memory address bits) to determine whether one or more of the n sets of volatile memory cells associated with the memory address stores the requested data. If the requested data is stored in the volatile memory 204, the interface controller 202 may transfer the requested data to the buffer 218 for transmission to the host device over the data bus 260.

If the requested data is not stored in the volatile memory 204, the interface controller 202 may retrieve the data from the non-volatile memory 206 and transfer the data to the buffer 218 for transmission to the host device over the data bus 260. Additionally, the interface controller 202 may transfer the requested data from the buffer 218 to the volatile memory 204 so that the data can be accessed with a lower latency during a subsequent retrieval operation. Before transferring the requested data, however, the interface controller 202 may first determine whether one or more of the n associated sets of volatile memory cells are available to store the requested data. The interface controller 202 may determine the availability of the n associated sets of volatile memory cells by communicating with the related cache management circuit set. If an associated set of volatile memory cells is available, the interface controller 202 may transfer the data in the buffer 218 to the volatile memory 204 without performing an eviction process. Otherwise, the interface controller 202 may transfer the data from the buffer 218 to the volatile memory 204 after performing an eviction process.

The memory subsystem 200 may be implemented in one or more configurations, including one-chip versions and multi-chip versions. A multi-chip version may include one or more constituents of the memory subsystem 200, including the interface controller 202, the volatile memory 204, and the non-volatile memory 206 (among other constituents or combinations of constituents), on a chip that is separate from a chip that includes one or more other constituents of the memory subsystem 200. For example, in one multi-chip version, respective separate chips may include each of the interface controller 202, the volatile memory 204, and the non-volatile memory 206. In contrast, a one-chip version may include the interface controller 202, the volatile memory 204, and the non-volatile memory 206 on a single chip.

As noted, in some examples the interface controller 202 may perform an eviction process (or "eviction procedure") that saves data from the volatile memory 204 in the non-volatile memory 206. The interface controller 202 may perform an eviction procedure for a row of a bank so that data in the row is preserved in the non-volatile memory 206, for example, before new data is written to the row. So, an eviction procedure may be appropriate when there is a read miss and data requested by the host device is moved from the non-volatile memory 206 to a row of the volatile memory 204 (so that it can be quickly accessed in the event of a subsequent request for the data). As another example, an eviction procedure may be appropriate when there is a write miss and a row in the volatile memory 204 is selected to store the data provided by the host device. In either example, the interface controller 202 may save any valid, dirty data in the victim row to preserve that data before the row is written with the new data.

Due to various inconsistencies (e.g., protocol inconsistencies, timing inconsistencies, page inconsistencies) or differences in operation between the volatile memory 204 and the non-volatile memory 206, the interface controller 202 may use an intermediary buffer, such a buffer 220, to relay victim data from a row of the volatile memory 204 to the non-volatile memory 206. But, transferring the victim data from the intermediary buffer to the non-volatile memory 206 may take longer than transferring the victim data from the volatile memory 204 (e.g., due to the page size difference between the memories). Thus, there may be a mismatch between the in-flow rate and the out-flow rate for a buffer 220. If each buffer 220 is for (e.g., dedicated to) a single respective bank, such a mismatch in in-flow rate and out-flow rate may prevent the interface controller 202 from efficiently handling back-to-back eviction procedures for the same bank because the buffer for that bank may be busy transferring data for one eviction procedure when another eviction procedure arises Thus, a later-occurring eviction procedure for a bank may be delayed until a previous eviction procedure for the bank is completed (e.g., the eviction procedures may be performed serially).

According to the techniques described herein, the interface controller 202 may service and satisfy back-to-back eviction procedures for the same bank by dynamically allocating buffers for the eviction procedures from a pool of buffers. This way, eviction procedures for the same bank may be performed in parallel (e.g., during overlapping times) rather than serially, which may reduce latency.

Figure 3:
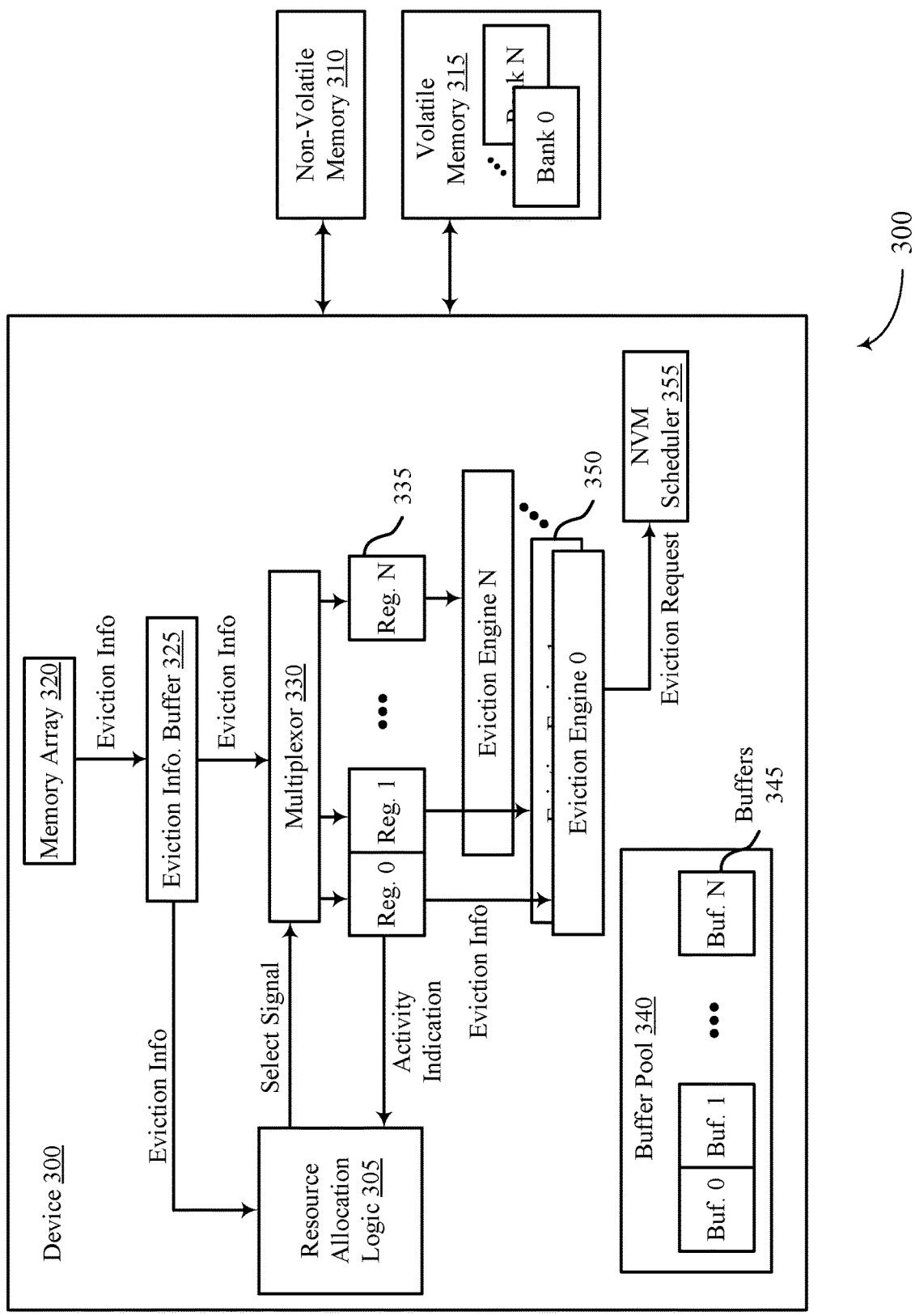
FIG. 3 illustrates an example of a device that supports dynamic allocation of buffers for eviction procedures in accordance with examples as disclosed herein.

FIG. 3 illustrates an example of a device 300 that supports dynamic allocation of buffers for eviction procedures in accordance with examples as disclosed herein. The device 300 may be an example of a memory subsystem or interface controller described herein. The device may be coupled with a non-volatile memory 310 and a volatile memory 315 and may include resource allocation logic 305. According to the techniques described herein, the resource allocation logic 305 may dynamically allocate intermediary buffers from a pool of intermediary buffers available for eviction procedures.

Although the functionality described herein may be attributed to various components for illustration, it should be appreciated that some functionality described herein may be distributed or shared between components or attributed to components other than in the manner described.

The device 300 may include a memory array 320, which may store metadata (or "storage information") for the volatile memory 315. For example, the memory array 320 may store tag information for the volatile memory 315, validity information for the volatile memory 315, dirty information for the volatile memory 315, and/or address information for the volatile memory 315. When the device 300 determines to perform an eviction operation for a row of the volatile memory 315, the memory array 320 may communicate information about the eviction procedure ("eviction information") to the eviction information buffer 325. Eviction information may refer to information that facilitates performance of an eviction procedure, such as the bank address and row address of the victim row, the target address of the non-volatile memory 310, validity information for the victim row, and/or dirty information for the victim row, among other information. In some examples, the memory array 320 may be an example of the memory array 252 or the memory array 254 described with reference to FIG. 2. Or the memory array 320 may be hybrid memory array that provides the functionality of the both the memory array 252 and the memory array 254.

The device 300 may include an eviction information buffer 325, which may store (e.g., temporarily store) eviction information for an eviction procedure. The eviction information buffer 325 may receive the eviction information for an eviction procedure from the memory array 320 and relay the eviction information for the eviction procedure to the resource allocation logic 305. The eviction information buffer 325 may also communicate eviction information for an eviction procedure to the multiplexor 330. In some examples, the eviction information buffer 325 may be operated as a first-in-first-out (FIFO) structure. Thus, eviction information may be communicated to the resource allocation logic 305 in the order of receipt from the memory array 320.

The device 300 may include the multiplexor 330, which may route eviction information from the eviction information buffer 325 to the registers 335. The destination for the eviction information may be based on, in some examples, a control signal from the resource allocation logic 305. For example, the multiplexor 330 may route eviction information for an eviction process to one of the N+1 registers 335 based on a select signal that is made up of one or more bits. For example, when there are sixteen (16) registers 335, the select signal may be made up of four bits, with different values of the bits indicating different registers.

The resource allocation logic 305 may be responsible for allocating buffers from the buffer pool 340 to banks for eviction procedures. For example, the resource allocation logic 305 may dynamically allocate a buffer 345 for an eviction procedure for a victim row indicated by the eviction information received from the memory array 320. To ensure that the resource allocation logic 305 does not select a buffer 345 that is busy with another eviction procedure, the resource allocation logic 305 may maintain a set of activity flags for the buffers 345. Each activity flag may be represented by one or more bits and may indicate the activity status of an associated buffer 345. So, if there are N+1 buffers 345, the resource allocation logic 305 may maintain N+1 activity flags. The activity status of a buffer may also be referred to as busy status, availability status, or other suitable terminology.

Thus, resource allocation logic 305 may select a buffer 345 for an eviction procedure based on the activity flags associated with the buffers 345. For example, the resource allocation logic 305 may avoid selecting a buffer 345 when its activity flag indicates that the buffer 345 is busy with an eviction procedure and may select a buffer 345 when its activity flag indicates that the buffer 345 is available for the eviction procedure. Once a buffer 345 is selected for an eviction procedure for a bank, the resource allocation logic 305 may communicate the select signal to the multiplexor 330 so that the eviction information for the bank is passed from the eviction information buffer 325 to the register 335 associated with the selected buffer 345.

At a given time, such as at an initial time (e.g., upon start-up, reset), the activity flags in the resource allocation logic 305 may be set to indicate that the buffers 345 are inactive (e.g., available for eviction processed). Once a buffer 345 is selected for an eviction process (or the select signal is communicated to the multiplexor 330), the resource allocation logic 305 may update the activity flag associated with that buffer 345 to indicate that the buffer 345 is busy (and thus should not be selected for another eviction process). The resource allocation logic 305 may maintain the state of the activity flag until the register associated with the buffer 345 indicates that the buffer 345 is finished with the eviction process. For example, the resource allocation logic 305 may receive a control signal (or "activity indication") that informs the resource allocation logic 305 that a buffer 345 is ready for a new eviction process. Upon receipt of the activity indication, the resource allocation logic 305 may reset the activity flag for the buffer 345 to reflect that the buffer 345 is available for an eviction process.

As noted, the resource allocation logic 305 may select buffers from the buffer pool 340, which may include multiple buffers 345 denoted Buf. 0 through Buf. N. At least some of the buffers 345 may be coupled with the non-volatile memory 310 and the volatile memory 315 so that victim data can be communicated from the volatile memory 315 to the non-volatile memory 310 via the buffers 345. In some examples, the size of at least some if not each buffer 345 may be equal to the page size of the volatile memory 315. Thus, a buffer 345 may receive and/or write data in sets of a first size (e.g., in 2 kB chunks) and read and/or communicate data in sets of a second size (e.g., 64 B). Additionally or alternatively, the buffer 345 may receive data from the volatile memory 315 at a first rate and communicate data to the non-volatile memory 310 at a second rate slower than the first rate. In some examples, the buffers 345 may be examples of buffers 220 described with reference to FIG. 2.

The registers 335 may store eviction information for banks undergoing eviction procedures. There may be one register 335 per buffer 345. Thus, each register 335 may have an associated buffer 345 to which the register 335 is dedicated. Additionally, each register 335 may have an associated eviction engine 350 to which the register 335 is coupled. Thus, there may be an eviction engine 350 for each register 335. However, other configurations are contemplated. The eviction information stored in a register 335 may be received from the eviction information buffer 325 via the multiplexor 330. Other components of the device 300 may reference the eviction information in the registers 335, and some or all of the eviction information stored in a register 335 may be communicated from the register 335 to the eviction engine 350 associated with that register 335 (e.g., so that the eviction engine 350 can relay the eviction information to the non-volatile memory scheduler 355). In some examples, the registers 335 may be examples of the register 256 or the register 258 described with reference to FIG. 2.

In addition to storing and communicating eviction information, the registers 335 may be responsible for informing the resource allocation logic 305 of the activity status of the buffers 345. For example, when a portion (e.g., the last portion) of dirty victim data is communicated from a buffer 345 to the non-volatile memory 310, the register 335 associated with that buffer 345 may send an activity indication to the resource allocation logic 305 so that the resource allocation logic 305 can update the activity flag for that buffer 345.

The eviction engines 350 may communicate requests for eviction procedures to the non-volatile memory scheduler 355. In some examples, the eviction engines 350 may also communicate eviction information for an eviction procedure to the non-volatile memory scheduler 355 so that the non-volatile memory scheduler 355 can issue the appropriate commands and target the appropriate addresses for an eviction process. The eviction engines 350 may be examples of the engine 246-b described with reference to FIG. 2 and the non-volatile memory scheduler 355 may be an example of the scheduler 248-a described with reference to FIG. 2. Thus, the device 300 may dynamically allocate buffers for eviction procedures.

Figure 4:
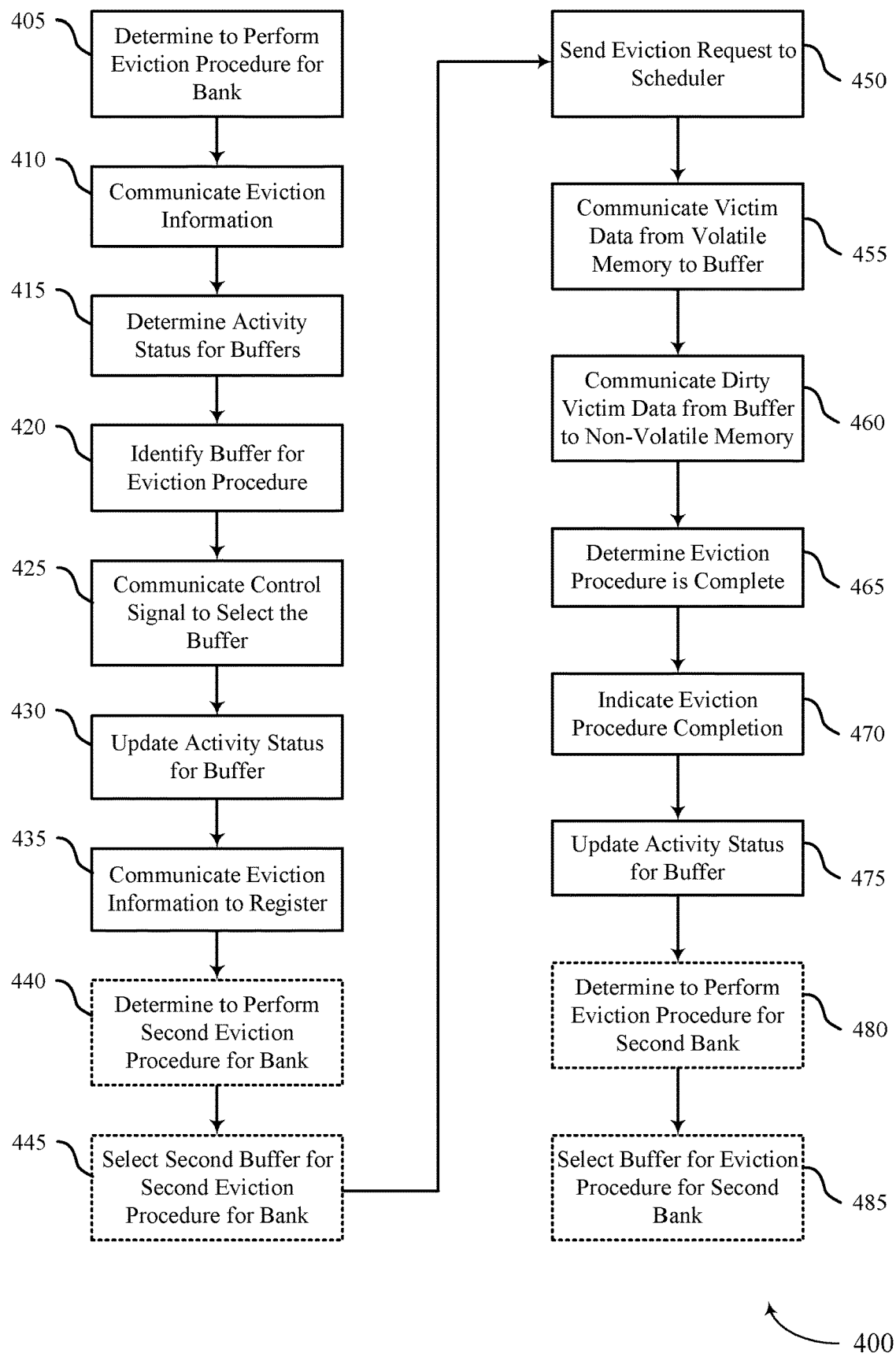
FIG. 4 illustrates an example of a process flow that supports dynamic allocation of buffers for eviction procedures in accordance with examples as disclosed herein.

FIG. 4 illustrates an example of a process flow 400 that supports dynamic allocation of buffers for eviction procedures in accordance with examples as disclosed herein. Process flow 400 may be implemented by an interface controller 115 as described with reference to FIG. 1, an interface controller 202 as described with reference to FIG. 2, or a device 300 as described with reference to FIG. 3. For ease of reference, the process flow 400 is described with reference to the device 300. For example, aspects of the process flow 400 may be implemented by the resource allocation logic 305, among other components. Additionally or alternatively, aspects of the process flow 400 may be implemented as instructions stored in memory (e.g., firmware stored in the volatile memory 120 and/or the non-volatile memory 125). For example, the instructions, when executed by a controller, may cause the controller to perform the operations of the process flow 400.

Alternative examples of the process flow 400 may be implemented in which some operations are performed in a different order than described or are not performed at all. In some cases, operations may include features not mentioned below, or additional operations may be added.

At 405, a determination to perform an eviction procedure for a bank may be made. For example, the device 300 may determine that an eviction procedure for bank n of the volatile memory 315 should be performed. The device 300 may determine to perform an eviction procedure if there is a read miss or write miss for a row in bank n and that row has valid dirty data that should be saved to the non-volatile memory 310 before the row is filled (e.g., with data requested by the host device or data provided by the host device). A read miss may occur when data requested by the host device is absent from the volatile memory 315. A write miss may occur when the volatile memory 315 does not store data from the non-volatile address associated with a write command. The device 300 may determine a read miss (or write miss) based on the tag information for the set of volatile memory rows associated with the non-volatile address indicated by the read command (or write command).

At 410, eviction information for the eviction procedure for the bank may be communicated. For example, eviction information for bank n may be communicated from the memory array 320 to the eviction information buffer 325. From the eviction information buffer 325, the eviction information may be communicated to the resource allocation logic 305 and the multiplexor 330.

At 415, the activity status for one or more buffers may be determined. For example, the resource allocation logic 305 may, based on receiving the eviction information, determine the activity status for one or more of the buffers 345.

At 420, a buffer may be identified for the eviction procedure. For example, the resource allocation logic 305 may identify a buffer 345 (e.g., buffer 0) for the eviction procedure for bank n. The resource allocation logic 305 may identify buffer 0 for the eviction procedure based at least in part on the activity status for buffer 0 indicating that the buffer is inactive (e.g., available for the procedure). The resource allocation logic 305 may identify buffer 0 for the eviction procedure based on the activity statuses of other buffers indicating that those buffers are active (e.g., busy with other eviction procedures). Thus, the device 300, through the resource allocation logic 305, may dynamically select one or more buffers for an eviction procedure for a bank.

At 425, a control signal may be communicated to select the identified one or more buffers. For example, the resource allocation logic 305 may communicate a Select signal to the multiplexor 330 so that the multiplexor 330 passes the eviction information for the eviction procedure to the register 335 associated with a buffer 0. At 430, the activity status for the buffer 0 may be updated to indicate that buffer 0 is busy with the eviction procedure. For example, the resource allocation logic 305 may update a flag (e.g., one or more bits) associated with buffer 0 to indicate that buffer 0 is busy with the eviction procedure. At 435, eviction information may be communicated to a register associated with the buffer. For example, the multiplexor 330 may communicate the eviction information for the eviction procedure to a register 335 (e.g., register 0) associated with the selected buffer (e.g., buffer 0).

In some examples, at 440, a determination to perform a second eviction procedure for the bank may be made (e.g., there may be a second miss for the bank). For example, the device 300 may determine that a second eviction procedure for bank n of the volatile memory 315 should be performed. At 445, a second buffer for the second eviction procedure for the bank may be selected. For example, the resource allocation logic 305 may select a second buffer 345 (e.g., buffer 1) for the second eviction procedure for bank n. The resource allocation logic 305 may select buffer 1 for the second eviction procedure based on the activity status for buffer 0 indicating that buffer 0 is busy with the first eviction procedure. The resource allocation logic 305 may select buffer 1 for the second eviction procedure based on the activity status for buffer 1 indicating that buffer 1 is inactive (e.g., available for the second eviction procedure). Selecting the second buffer (e.g., buffer 1) for the second eviction procedure may involve operations similar to those at 415 through 435. Additionally, the second eviction procedure for bank n may be implemented using operations similar to those at 450 through 475.

At 450, an eviction request for the first eviction procedure may be transmitted to a scheduler. For example, the eviction engine 350 (e.g., eviction engine 0) associated with the selected register 335 (e.g., register 0) for the first eviction procedure may transmit an eviction request to the non-volatile memory scheduler 355. The eviction engine 0 may transmit the eviction request based receiving the eviction information for the first eviction procedure from register 0. In some examples, the eviction request may include or be accompanied by some or all of the eviction information for the first eviction procedure. At 455, victim data from the bank may be communicated from the volatile memory 315 to the buffer selected for the first eviction procedure. For example, the victim data from row n may be communicated from the volatile memory 315 to buffer 0.

At 460, dirty sets of victim data may be communicated from the buffer to the non-volatile memory. The dirty sets of victim data may be identified based on the eviction data in register 0. In some examples, the victim data may be communicated from buffer 0 to the non-volatile memory 310 based at least in part on commands issued by the non-volatile memory scheduler 355 (e.g., in response to the eviction request). At 465, it may be determined that the eviction procedure is complete. For example, register 0 may determine that all of the dirty victim data in buffer 0 has been communicated to the non-volatile memory 310. At 470, an indication that the eviction procedure has been completed may be communicated. For example, register 0 may transmit to the resource allocation logic 305 that the eviction procedure involving buffer 0 has been completed. At 475, the activity status for the buffer may be updated. For example, the resource allocation logic 305 may update the flag for buffer 0 to indicate that buffer 0 is inactive (e.g., available for a new eviction procedure).

In some examples, at 480, a determination to perform an eviction procedure for a second bank may be made. For example, the device 300 may determine that an eviction procedure for bank x of the volatile memory 315 should be performed. At 485, a buffer for the eviction procedure for the second bank may be selected. For example, the resource allocation logic 305 may select buffer 0 for the eviction procedure for bank x. The resource allocation logic 305 may select buffer 0 for the eviction procedure for bank x based on the activity status for buffer 0 indicating that buffer 0 is inactive. The resource allocation logic 305 may select buffer 0 for the second eviction procedure based on the activity statuses for other buffers indicating that those buffers are busy with other eviction procedures. Selecting the buffer 0 for the eviction procedure for bank x may involve operations similar to those at 415 through 435. Additionally, the eviction procedure for bank x may be implemented using operations similar to those at 450 through 475. Thus, a device may dynamically allocate buffers for eviction procedures.

Figure 5:
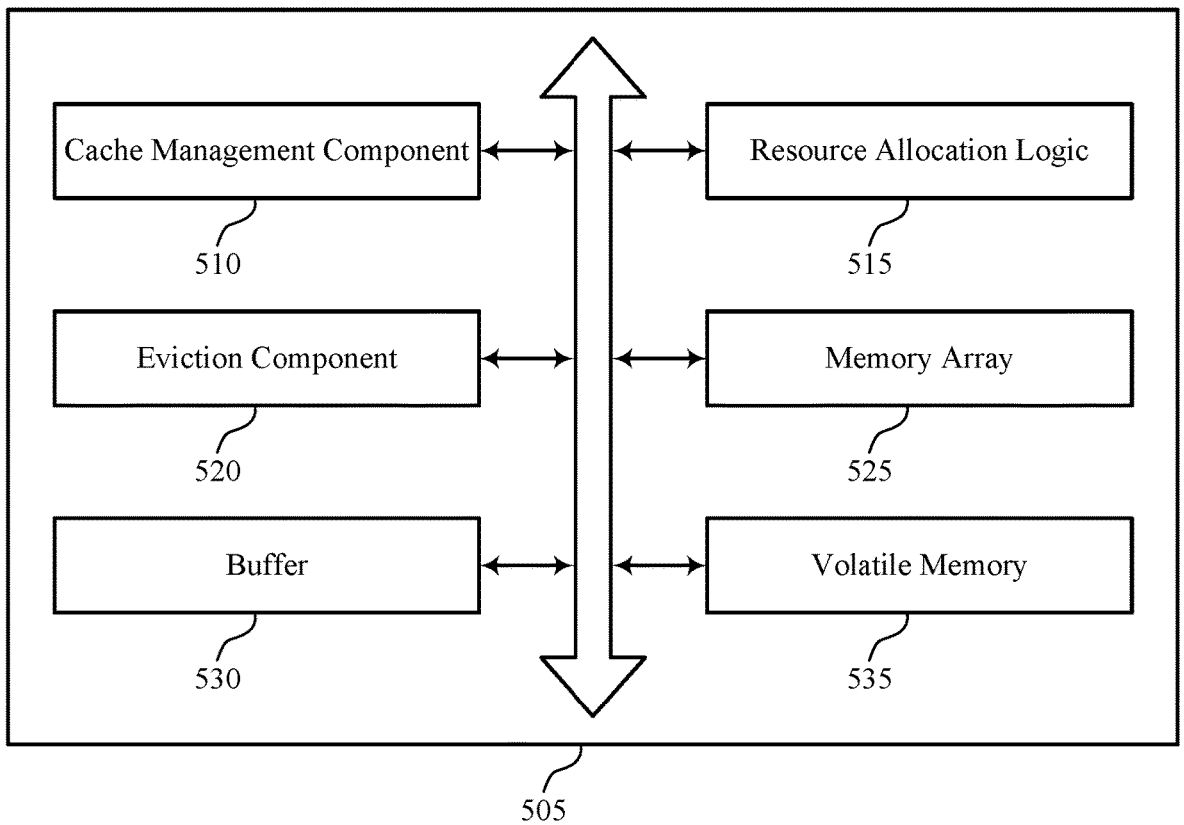
FIG. 5 shows a block diagram of a device that supports dynamic allocation of buffers for eviction procedures in accordance with aspects of the present disclosure.

FIG. 5 shows a block diagram 500 of an apparatus 505 that supports dynamic allocation of buffers for eviction procedures in accordance with examples as disclosed herein. The apparatus 505 may be an example of aspects of a memory subsystem 110, an interface controller 115, a memory subsystem 200, and interface controller 202, or a device 300 as described herein. The apparatus 505 may include a cache management component 510, a resource allocation logic 515, an eviction component 520, a memory array 525, a buffer 530, and a volatile memory 535. Each of these components may include circuitry configured to perform the functions described herein. Each of these components may communicate, directly or indirectly, with one another (e.g., via one or more buses or other conductive connections).

The cache management component 510 may be or include logic, circuitry, a processor, a controller, or other components capable of performing the functions described herein. The resource allocation logic 515 may be example of the resource allocation logic 305 described with reference to FIG. 3. The resource allocation logic 515 may be or include logic, circuitry, a processor, a controller, or other components capable of performing the functions described herein. The eviction component 520 may be or include logic, circuitry, a processor, a controller, or other components capable of performing the functions described herein. The memory array 525 may be an example of the memory array 320 described with reference to FIG. 3. The memory array 320 may be or include an array, a sub-array, a memory, a register, a buffer, a bus interface, logic, circuitry, a processor, a controller, or other component capable of performing the functions described herein. The buffer 530 may be an example of a buffer 345 as described with reference to FIG. 3. The buffer 530 may be or include an array, a sub-array, a memory, a register, a buffer, a bus interface, logic, circuitry, a processor, a controller, or other component capable of performing the functions described herein. The volatile memory 535 may be an example of the volatile memory 315 described with reference to FIG. 3. The volatile memory 535 may be or include an array, a sub-array, a memory, a register, a buffer, a bus interface, logic, circuitry, a processor, a controller, or other component capable of performing the functions described herein.

The cache management component 510 may determine to perform an eviction procedure for a bank of the multiple banks, where the eviction procedure includes saving data from the bank of the volatile memory to the non-volatile memory.

In some examples, the cache management component 510 may determine to perform an eviction procedure for a bank of a volatile memory that operates as a cache for a non-volatile memory, where the eviction procedure saves data from the bank of the volatile memory to the non-volatile memory.

In some examples, determining to perform a second eviction procedure for a second bank of the volatile memory, where the second eviction procedure includes saving second data from the second bank of the volatile memory to the non-volatile memory.

In some examples, determining to perform a second eviction procedure for the bank of the volatile memory, where the second eviction procedure includes saving second data from the bank of the volatile memory to the non-volatile memory.

In some examples, the cache management component 510 may determine that data requested by a host device is absent from the bank of the volatile memory, where the determination to perform the eviction procedure for the bank is based on determining that the data requested by the host device is absent from the bank.

In some examples, the cache management component 510 may determine that data from a non-volatile memory address targeted by a write command from a host device is absent from the bank of the volatile memory, where the determination to perform the eviction procedure for the bank is based on determining that the data from the non-volatile memory address targeted by the write command is absent from the bank of the volatile memory.

In some examples, determining to perform a second eviction procedure for a second bank of the volatile memory, where the second eviction procedure includes saving second data from the second bank of the volatile memory to the non-volatile memory.

The resource allocation logic 515 may select, from the pool of buffers, a buffer for the eviction procedure for the bank of the volatile memory based on an activity status for the buffer.

In some examples, the resource allocation logic 515 may receive information for a row in a bank of the volatile memory that is selected to undergo a procedure that saves data from the row to the non-volatile memory.

In some examples, the resource allocation logic 515 may determine, from a pool of buffers, a buffer for the procedure based on a flag for the buffer indicating that the buffer is available.

In some examples, the resource allocation logic 515 may communicate, based on determining the buffer, a control signal to select the buffer for the procedure for the row in the bank of the volatile memory.

In some examples, the resource allocation logic 515 may determine an activity status for at least one buffer in a pool of buffers coupled with the volatile memory and the non-volatile memory.

In some examples, the resource allocation logic 515 may select a buffer from the pool of buffers for the eviction procedure for the bank of the volatile memory based on the activity status for that buffer.

In some examples, the resource allocation logic 515 may reference a set of bits that indicates activity statuses for the pool of buffers.

In some examples, the resource allocation logic 515 may determine the activity status for the buffer based on a bit for the buffer in the set of bits.

In some examples, the resource allocation logic 515 may update, based on selecting the buffer for the eviction procedure, the activity status for the buffer to indicate that the buffer is busy based on the eviction procedure.

In some examples, the resource allocation logic 515 may update, based on completing the eviction procedure, the activity status for the buffer to indicate that the buffer is inactive.

In some examples, the resource allocation logic 515 may select the buffer for the second eviction procedure for the second bank of the volatile memory based on the activity status for the buffer indicating that the buffer is inactive.

In some examples, the resource allocation logic 515 may determine that a second buffer from the pool of buffers is busy based on a second eviction procedure, where the buffer is selected based on the second buffer being busy.

In some examples, the resource allocation logic 515 may update the activity status of the buffer to indicate that the buffer is busy based on the eviction procedure.

In some examples, the resource allocation logic 515 may select a second buffer from the pool of buffers for the second eviction procedure for the bank based on the activity status for the buffer indicating that the buffer is busy.

In some examples, the resource allocation logic 515 may maintain, for each buffer in the pool of buffers, a respective flag indicating an activity status for that buffer, where the buffer is determined based on maintaining the respective flag indicating the activity status for that buffer.

In some examples, the resource allocation logic 515 may determine, based on a second flag, that a second buffer from the pool of buffers is unavailable for the procedure, where the buffer is determined based on the second buffer being unavailable for the procedure.

In some examples, the resource allocation logic 515 may update the flag for the buffer to indicate that the buffer is unavailable for a second procedure based on determining the buffer for the procedure.

In some examples, the resource allocation logic 515 may communicate the control signal to a register associated with the buffer.

In some examples, the resource allocation logic 515 may receive, from the register, an indication that the data from the row has been communicated from the buffer to the non-volatile memory.

In some examples, the resource allocation logic 515 may update, based on the indication from the register, the flag for the buffer to indicate that the buffer is available.

In some examples, the resource allocation logic 515 may receive information for a second row in the bank that is selected to undergo a second procedure that saves second data from the second row to the non-volatile memory.

In some examples, the resource allocation logic 515 may select, from the pool of buffers, a second buffer for the second procedure based on a second flag for the second buffer indicating that the second buffer is available.

In some examples, the resource allocation logic 515 may update, based on determining the buffer for the procedure, the flag for the buffer to indicate that the buffer is unavailable, where the second buffer is selected based on the flag for the buffer indicating that the buffer is unavailable.

In some examples, the resource allocation logic 515 may reference a set of bits that indicates activity statuses for the pool of buffers.

In some examples, the resource allocation logic 515 may determine the activity status for the buffer based on a bit for the buffer in the set of bits.

In some examples, the resource allocation logic 515 may update, based on selecting the buffer for the eviction procedure, the activity status for the buffer to indicate that the buffer is busy based at least in part the eviction procedure.

In some examples, the resource allocation logic 515 may update, based on completing the eviction procedure, the activity status for the buffer to indicate that the buffer is inactive.

In some examples, the resource allocation logic 515 may select the buffer for the second eviction procedure for the second bank of the volatile memory based on the activity status for the buffer indicating that the buffer is inactive.

In some examples, the resource allocation logic 515 may determine that a second buffer from the pool of buffers is busy based on a second eviction procedure, where the buffer is selected based on the second buffer being busy.

The eviction component 520 may perform the eviction procedure for the bank of the volatile memory using the selected buffer.

In some examples, the eviction component 520 may perform the eviction procedure for the bank of the volatile memory using the selected buffer.

The memory array 525 may communicate, based on determining to perform the eviction procedure for the row, dirty information for the row from a memory array to a register associated with the selected buffer.

The buffer 530 may communicate dirty data from the buffer associated with the register to the non-volatile memory based on the dirty information in the register.

In some examples, the buffer 530 may communicate at least a portion of the data from the buffer to the non-volatile memory at a second rate.

The volatile memory 535 may communicate the data from the bank of the volatile memory to the buffer at a first rate.

Figure 6:
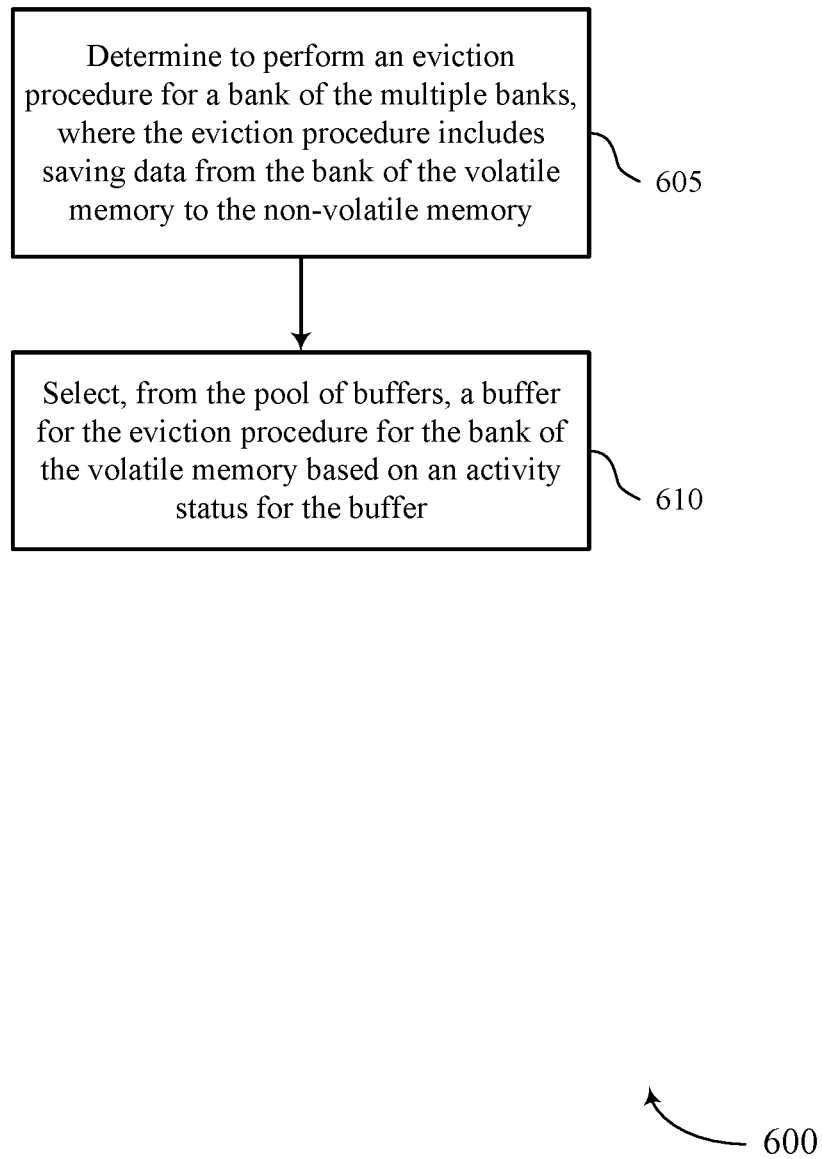
FIGS. 6 through 8 show flowcharts illustrating a method or methods that support dynamic allocation of buffers for eviction procedures in accordance with examples as disclosed herein.

FIG. 6 shows a flowchart illustrating a method or methods 600 that supports dynamic allocation of buffers for eviction procedures in accordance with aspects of the present disclosure. The operations of method 600 may be implemented by a memory subsystem or its components as described herein. For example, the operations of method 600 may be performed by a memory subsystem as described with reference to FIGS. 1 and 2. In some examples, a memory subsystem may execute a set of instructions to control the functional elements of the memory subsystem to perform the described functions.

Additionally or alternatively, a memory subsystem may perform aspects of the described functions using special-purpose hardware.

In some examples, the operations of method 600 may be implemented by an apparatus that includes a non-volatile memory and a volatile memory comprising multiple banks and configured to operate as a cache for the non-volatile memory. The apparatus may also include a pool of buffers coupled with the non-volatile memory and the volatile memory and an interface controller coupled with the non-volatile memory and the volatile memory. The interface controller operable to cause the apparatus to perform the operations of method 600.

At 605, the device may determine to perform an eviction procedure for a bank of the multiple banks, where the eviction procedure includes saving data from the bank of the volatile memory to the non-volatile memory. The operations of 605 may be performed according to the methods described herein. In some examples, aspects of the operations of 605 may be performed by a cache management component as described with reference to FIG. 5.

At 610, the device may select, from the pool of buffers, a buffer for the eviction procedure for the bank of the volatile memory based on an activity status for the buffer. The operations of 610 may be performed according to the methods described herein. In some examples, aspects of the operations of 610 may be performed by a resource allocation component as described with reference to FIG. 5.

In some examples, an apparatus as described herein may perform a method or methods, such as the method 600. The apparatus may include a non-volatile memory; a volatile memory comprising multiple banks and configured to operate as a cache for the non-volatile memory; a pool of buffers coupled with the non-volatile memory and the volatile memory; and an interface controller coupled with the non-volatile memory and the volatile memory and configured to cause the apparatus to perform the techniques describe herein. The apparatus may include features, means, or instructions (e.g., a non-transitory computer-readable medium storing instructions executable by a processor) for determining to perform an eviction procedure for a bank of the multiple banks, where the eviction procedure includes saving data from the bank of the volatile memory to the non-volatile memory and selecting, from the pool of buffers, a buffer for the eviction procedure for the bank of the volatile memory based on an activity status for the buffer.

Some examples of the method 600 and the apparatus described herein may further include operations, features, means, or instructions for referencing a set of bits that indicates activity statuses for the pool of buffers, and determining the activity status for the buffer based on a bit for the buffer in the set of bits.

In some examples of the method 600 and the apparatus described herein, the bit for the buffer indicates that the buffer may be inactive, the method further including updating, based on selecting the buffer for the eviction procedure, the bit for the buffer to indicate that the buffer may be busy based on the eviction procedure.

Some examples of the method 600 and the apparatus described herein may further include operations, features, means, or instructions for updating, based on selecting the buffer for the eviction procedure, the activity status for the buffer to indicate that the buffer may be busy based on the eviction procedure, performing the eviction procedure for the bank of the volatile memory using the selected buffer, and updating, based on completing the eviction procedure, the activity status for the buffer to indicate that the buffer may be inactive.

Some examples of the method 600 and the apparatus described herein may further include operations, features, means, or instructions for determining to perform a second eviction procedure for a second bank of the volatile memory, where the second eviction procedure includes saving second data from the second bank of the volatile memory to the non-volatile memory, and selecting the buffer for the second eviction procedure for the second bank of the volatile memory based on the activity status for the buffer indicating that the buffer may be inactive.

Some examples of the method 600 and the apparatus described herein may further include operations, features, means, or instructions for determining that a second buffer from the pool of buffers may be busy based on a second eviction procedure, where the buffer may be selected based on the second buffer being busy.

Some examples of the method 600 and the apparatus described herein may further include operations, features, means, or instructions for updating the activity status of the buffer to indicate that the buffer may be busy based on the eviction procedure, determining to perform a second eviction procedure for the bank of the volatile memory, where the second eviction procedure includes saving second data from the bank of the volatile memory to the non-volatile memory, and selecting a second buffer from the pool of buffers for the second eviction procedure for the bank based on the activity status for the buffer indicating that the buffer may be busy.

Some examples of the method 600 and the apparatus described herein may further include operations, features, means, or instructions for communicating, based on determining to perform the eviction procedure for the row, dirty information for the row from a memory array to a register associated with the selected buffer, and communicating dirty data from the buffer associated with the register to the non-volatile memory based on the dirty information in the register.

Some examples of the method 600 and the apparatus described herein may further include operations, features, means, or instructions for determining that data requested by a host device may be absent from the bank of the volatile memory, where the determination to perform the eviction procedure for the bank may be based on determining that the data requested by the host device may be absent from the bank.

Some examples of the method 600 and the apparatus described herein may further include operations, features, means, or instructions for determining that data from a non-volatile memory address targeted by a write command from a host device may be absent from the bank of the volatile memory, where the determination to perform the eviction procedure for the bank may be based on determining that the data from the non-volatile memory address targeted by the write command may be absent from the bank of the volatile memory.

Some examples of the method 600 and the apparatus described herein may further include operations, features, means, or instructions for communicating the data from the bank of the volatile memory to the buffer at a first rate, and communicating at least a portion of the data from the buffer to the non-volatile memory at a second rate.

Figure 7:
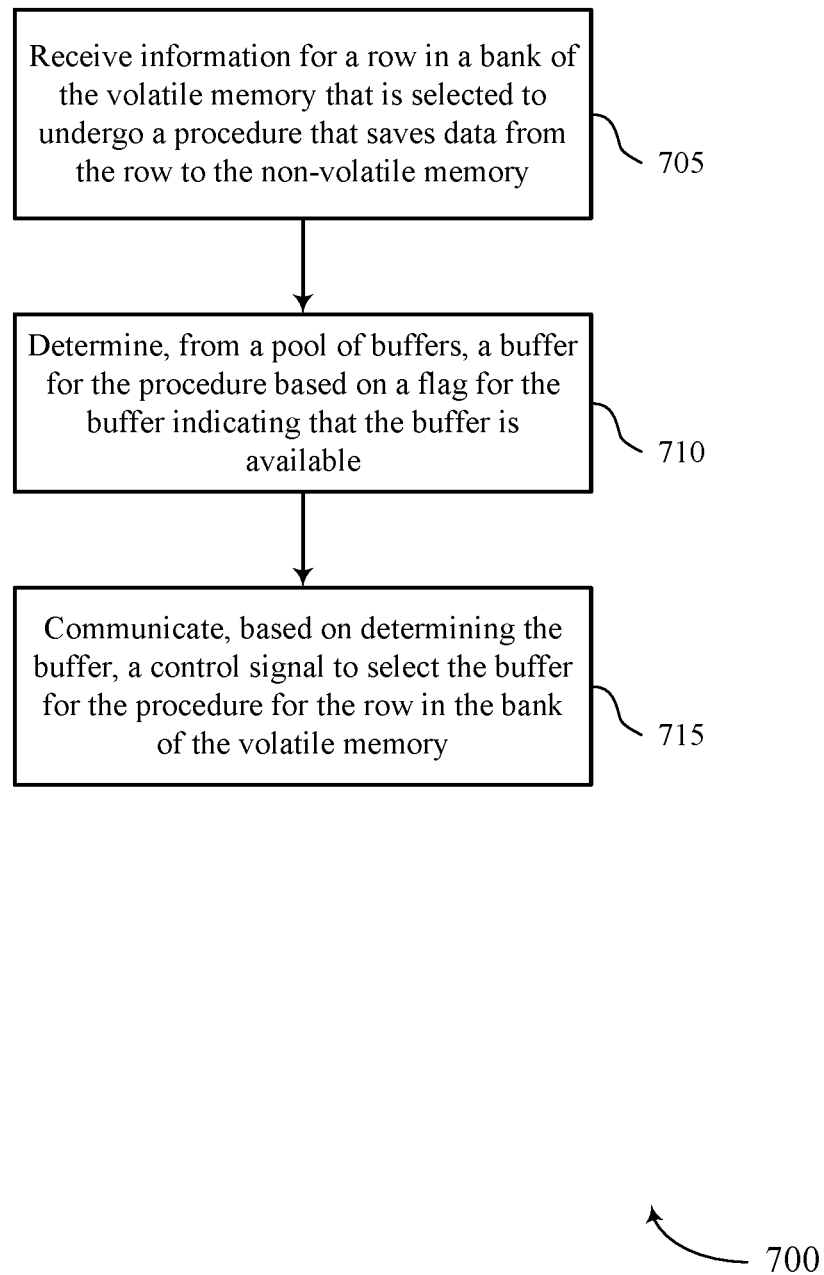

FIG. 7 shows a flowchart illustrating a method or methods 700 that supports dynamic allocation of buffers for eviction procedures in accordance with aspects of the present disclosure. The operations of method 700 may be implemented by a memory subsystem or its components as described herein. For example, the operations of method 700 may be performed by a memory subsystem as described with reference to FIGS. 1 and 2. In some examples, a memory subsystem may execute a set of instructions to control the functional elements of the memory subsystem to perform the described functions.

Additionally or alternatively, a memory subsystem may perform aspects of the described functions using special-purpose hardware.

In some examples, the operations of method 700 may be implemented by an apparatus that includes a non-volatile memory and a volatile memory comprising multiple banks and configured to operate as a cache for the non-volatile memory. The apparatus may also include an interface controller with logic operable to cause the apparatus to perform the operations of method 700.

At 705, the device may receive information for a row in a bank of the volatile memory that is selected to undergo a procedure that saves data from the row to the non-volatile memory. The operations of 705 may be performed according to the methods described herein. In some examples, aspects of the operations of 705 may be performed by a resource allocation logic as described with reference to FIG. 5.

At 710, the device may determine, from a pool of buffers, a buffer for the procedure based on a flag for the buffer indicating that the buffer is available. The operations of 710 may be performed according to the methods described herein. In some examples, aspects of the operations of 710 may be performed by a resource allocation logic as described with reference to FIG. 5.

At 715, the device may communicate, based on determining the buffer, a control signal to select the buffer for the procedure for the row in the bank of the volatile memory. The operations of 715 may be performed according to the methods described herein. In some examples, aspects of the operations of 715 may be performed by a resource allocation logic as described with reference to FIG. 5.

In some examples, an apparatus as described herein may perform a method or methods, such as the method 700. The apparatus may include a non-volatile memory; a volatile memory comprising multiple banks and configured to operate as a cache for the non-volatile memory; and an interface controller that is coupled with the non-volatile memory and that includes logic operable to perform the techniques describe herein. The apparatus may include features, means, or instructions (e.g., a non-transitory computer-readable medium storing instructions executable by a processor) for receiving information for a row in a bank of the volatile memory that is selected to undergo a procedure that saves data from the row to the non-volatile memory, determining, from a pool of buffers, a buffer for the procedure based on a flag for the buffer indicating that the buffer is available, and communicating, based on determining the buffer, a control signal to select the buffer for the procedure for the row in the bank of the volatile memory.

Some examples of the method 700 and the apparatus described herein may further include operations, features, means, or instructions for maintaining, for each buffer in the pool of buffers, a respective flag indicating an activity status for that buffer, where the buffer may be determined based on maintaining the respective flag indicating the activity status for that buffer.

Some examples of the method 700 and the apparatus described herein may further include operations, features, means, or instructions for determining, based on a second flag, that a second buffer from the pool of buffers may be unavailable for the procedure, where the buffer may be determined based on the second buffer being unavailable for the procedure.

Some examples of the method 700 and the apparatus described herein may further include operations, features, means, or instructions for updating the flag for the buffer to indicate that the buffer may be unavailable for a second procedure based on determining the buffer for the procedure.

Some examples of the method 700 and the apparatus described herein may further include operations, features, means, or instructions for communicating the control signal to a register associated with the buffer, receiving, from the register, an indication that the data from the row may have been communicated from the buffer to the non-volatile memory, and updating, based on the indication from the register, the flag for the buffer to indicate that the buffer may be available.

Some examples of the method 700 and the apparatus described herein may further include operations, features, means, or instructions for receiving information for a second row in the bank that may be selected to undergo a second procedure that saves second data from the second row to the non-volatile memory, and selecting, from the pool of buffers, a second buffer for the second procedure based on a second flag for the second buffer indicating that the second buffer may be available.

In some examples of the method 700 and the apparatus described herein, the procedure and the second procedure at least partially overlap in time.

Some examples of the method 700 and the apparatus described herein may further include operations, features, means, or instructions for updating, based on determining the buffer for the procedure, the flag for the buffer to indicate that the buffer may be unavailable, where the second buffer may be selected based on the flag for the buffer indicating that the buffer may be unavailable.

Figure 8:
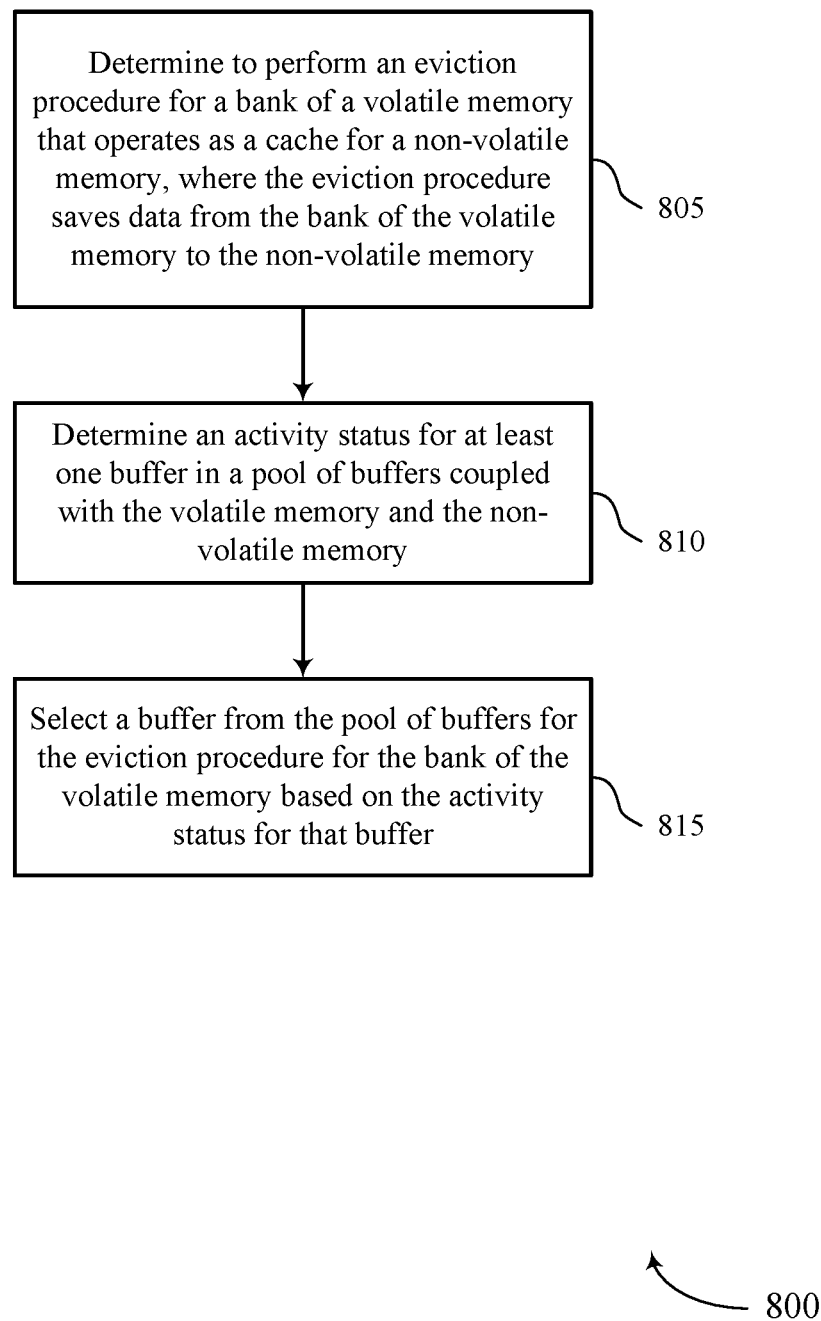

FIG. 8 shows a flowchart illustrating a method or methods 800 that supports dynamic allocation of buffers for eviction procedures in accordance with aspects of the present disclosure. The operations of method 800 may be implemented by a memory subsystem or its components as described herein. For example, the operations of method 800 may be performed by a memory subsystem as described with reference to FIGS. 1 and 2. In some examples, a memory subsystem may execute a set of instructions to control the functional elements of the memory subsystem to perform the described functions. Additionally or alternatively, a memory subsystem may perform aspects of the described functions using special-purpose hardware.

At 805, the device may determine to perform an eviction procedure for a bank of a volatile memory that operates as a cache for a non-volatile memory, where the eviction procedure saves data from the bank of the volatile memory to the non-volatile memory. The operations of 805 may be performed according to the methods described herein. In some examples, aspects of the operations of 805 may be performed by a cache management component as described with reference to FIG. 5.

At 810, the device may determine an activity status for at least one buffer in a pool of buffers coupled with the volatile memory and the non-volatile memory. The operations of 810 may be performed according to the methods described herein. In some examples, aspects of the operations of 810 may be performed by a resource allocation component as described with reference to FIG. 5.

At 815, the device may select a buffer from the pool of buffers for the eviction procedure for the bank of the volatile memory based on the activity status for that buffer. The operations of 815 may be performed according to the methods described herein. In some examples, aspects of the operations of 815 may be performed by a resource allocation component as described with reference to FIG. 5.

In some examples, an apparatus as described herein may perform a method or methods, such as the method 800. The apparatus may include features, means, or instructions (e.g., a non-transitory computer-readable medium storing instructions executable by a processor) for determining to perform an eviction procedure for a bank of a volatile memory that operates as a cache for a non-volatile memory, where the eviction procedure saves data from the bank of the volatile memory to the non-volatile memory, determining an activity status for at least one buffer in a pool of buffers coupled with the volatile memory and the non-volatile memory, and selecting a buffer from the pool of buffers for the eviction procedure for the bank of the volatile memory based on the activity status for that buffer.

Some examples of the method 800 and the apparatus described herein may further include operations, features, means, or instructions for referencing a set of bits that indicates activity statuses for the pool of buffers, and determining the activity status for the buffer based on a bit for the buffer in the set of bits.

In some examples of the method 800 and the apparatus described herein, the bit for the buffer indicates that the buffer may be inactive, the method further including updating, based on selecting the buffer for the eviction procedure, the bit for the buffer to indicate that the buffer may be busy based on the eviction procedure.

Some examples of the method 800 and the apparatus described herein may further include operations, features, means, or instructions for updating, based on selecting the buffer for the eviction procedure, the activity status for the buffer to indicate that the buffer may be busy based at least in part the eviction procedure, performing the eviction procedure for the bank of the volatile memory using the selected buffer, and updating, based on completing the eviction procedure, the activity status for the buffer to indicate that the buffer may be inactive.

Some examples of the method 800 and the apparatus described herein may further include operations, features, means, or instructions for determining to perform a second eviction procedure for a second bank of the volatile memory, where the second eviction procedure includes saving second data from the second bank of the volatile memory to the non-volatile memory, and selecting the buffer for the second eviction procedure for the second bank of the volatile memory based on the activity status for the buffer indicating that the buffer may be inactive.

Some examples of the method 800 and the apparatus described herein may further include operations, features, means, or instructions for determining that a second buffer from the pool of buffers may be busy based on a second eviction procedure, where the buffer may be selected based on the second buffer being busy.

It should be noted that the methods described above describe possible implementations, and that the operations and the steps may be rearranged or otherwise modified and that other implementations are possible. Furthermore, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

A protocol may define one or more communication procedures and one or more communication parameters supported for use by a device or component. For example, a protocol may define various operations, a timing and a frequency for those operations, a meaning of various commands or signals or both, one or more addressing scheme(s) for one or more memories, a type of communication for which pins are reserved, a size of data handled at various components such as interfaces, a data rate supported by various components such as interfaces, or a bandwidth supported by various components such as interfaces, among other parameters and metrics, or any combination thereof. Use of a shared protocol may enable interaction between devices because each device may operate in a manner expected, recognized, and understood by another device. For example, two devices that support the same protocol may interact according to the policies, procedures, and parameters defined by the protocol, whereas two devices that support different protocols may be incompatible.

To illustrate, two devices that support different protocols may be incompatible because the protocols define different addressing schemes (e.g., different quantities of address bits). As another illustration, two devices that support different protocols may be incompatible because the protocols define different transfer procedures for responding to a single command (e.g., the burst length or quantity of bytes permitted in response to the command may differ). Merely translating a command to an action should not be construed as use of two different protocols. Rather, two protocols may be considered different if corresponding procedures or parameters defined by the protocols vary. For example, a device may be said to support two different protocols if the device supports different addressing schemes, or different transfer procedures for responding to a command.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
a non-volatile memory;
a volatile memory comprising multiple banks and configured to operate as a cache for the non-volatile memory;
a pool of buffers coupled with the non-volatile memory and the volatile memory; and
an interface controller coupled with the non-volatile memory and the volatile memory, the interface controller operable to cause the apparatus to:
determine to perform an eviction procedure for a bank of the multiple banks, wherein the eviction procedure comprises saving data from the bank of the volatile memory to the non-volatile memory; and
select, from the pool of buffers, a buffer for the eviction procedure for the bank of the volatile memory based at least in part on an activity status for the buffer.

2. The apparatus of claim 1, wherein the interface controller is operable to cause the apparatus to:
reference a set of bits that indicates activity statuses for the pool of buffers; and
determine the activity status for the buffer based at least in part on a bit for the buffer in the set of bits.

3. The apparatus of claim 2, wherein the bit for the buffer indicates that the buffer is inactive, and wherein the interface controller is operable to cause the apparatus to:
update, based at least in part on selecting the buffer for the eviction procedure, the bit for the buffer to indicate that the buffer is busy based at least in part on the eviction procedure.

4. The apparatus of claim 1, wherein the interface controller is operable to cause the apparatus to:
update, based at least in part on selecting the buffer for the eviction procedure, the activity status for the buffer to indicate that the buffer is busy based at least in part on the eviction procedure;
perform the eviction procedure for the bank of the volatile memory using the selected buffer; and
update, based at least in part on completing the eviction procedure, the activity status for the buffer to indicate that the buffer is inactive.

5. The apparatus of claim 4, wherein the interface controller is operable to cause the apparatus to:
determine to perform a second eviction procedure for a second bank of the volatile memory, wherein the second eviction procedure comprises saving second data from the second bank of the volatile memory to the non-volatile memory; and
select the buffer for the second eviction procedure for the second bank of the volatile memory based at least in part on the activity status for the buffer indicating that the buffer is inactive.

6. The apparatus of claim 1, wherein the interface controller is operable to cause the apparatus to:
determine that a second buffer from the pool of buffers is busy based at least in part on a second eviction procedure, wherein the buffer is selected based at least in part on the second buffer being busy.

7. The apparatus of claim 1, wherein the interface controller is operable to cause the apparatus to:
update the activity status of the buffer to indicate that the buffer is busy based at least in part on the eviction procedure;
determine to perform a second eviction procedure for the bank of the volatile memory, wherein the second eviction procedure comprises saving second data from the bank of the volatile memory to the non-volatile memory; and
select a second buffer from the pool of buffers for the second eviction procedure for the bank based at least in part on the activity status for the buffer indicating that the buffer is busy.

8. The apparatus of claim 1, wherein eviction procedure is for a row in the bank, and wherein the interface controller is operable to cause the apparatus to:
communicate, based at least in part on determining to perform the eviction procedure for the row, dirty information for the row from a memory array to a register associated with the selected buffer; and
communicate dirty data from the buffer associated with the register to the non-volatile memory based at least in part on the dirty information in the register.

9. The apparatus of claim 1, wherein the interface controller is operable to cause the apparatus to:
determine that data requested by a host device is absent from the bank of the volatile memory, wherein the determination to perform the eviction procedure for the bank is based at least in part on determining that the data requested by the host device is absent from the bank.

10. The apparatus of claim 1, wherein the interface controller is operable to cause the apparatus to:
determine that data from a non-volatile memory address targeted by a write command from a host device is absent from the bank of the volatile memory, wherein the determination to perform the eviction procedure for the bank is based at least in part on determining that the data from the non-volatile memory address targeted by the write command is absent from the bank of the volatile memory.

11. The apparatus of claim 1, wherein the interface controller is operable to cause the apparatus to:
communicate the data from the bank of the volatile memory to the buffer at a first rate; and
communicate at least a portion of the data from the buffer to the non-volatile memory at a second rate.

12. An apparatus, comprising:
a non-volatile memory;
a volatile memory comprising multiple banks and configured to operate as a cache for the non-volatile memory; and
an interface controller coupled with the non-volatile memory and the volatile memory, the interface controller comprising logic operable to:
receive information for a row in a bank of the volatile memory that is selected to undergo a procedure that saves data from the row to the non-volatile memory;
determine, from a pool of buffers, a buffer for the procedure based at least in part on a flag for the buffer indicating that the buffer is available; and
communicate, based at least in part on determining the buffer, a control signal to select the buffer for the procedure for the row in the bank of the volatile memory.

13. The apparatus of claim 12, wherein the logic is operable to:
maintain, for each buffer in the pool of buffers, a respective flag indicating an activity status for that buffer, wherein the buffer is determined based at least in part on maintaining the respective flag indicating the activity status for that buffer.

14. The apparatus of claim 12, wherein the logic is operable to:
determine, based at least in part on a second flag, that a second buffer from the pool of buffers is unavailable for the procedure, wherein the buffer is determined based at least in part on the second buffer being unavailable for the procedure.

15. The apparatus of claim 12, wherein the logic is operable to:
update the flag for the buffer to indicate that the buffer is unavailable for a second procedure based at least in part on determining the buffer for the procedure.

16. The apparatus of claim 15, wherein the logic is operable to:
communicate the control signal to a register associated with the buffer;
receive, from the register, an indication that the data from the row has been communicated from the buffer to the non-volatile memory; and
update, based at least in part on the indication from the register, the flag for the buffer to indicate that the buffer is available.

17. The apparatus of claim 12, wherein the logic is operable to:
receive information for a second row in the bank that is selected to undergo a second procedure that saves second data from the second row to the non-volatile memory; and
select, from the pool of buffers, a second buffer for the second procedure based at least in part on a second flag for the second buffer indicating that the second buffer is available.

18. The apparatus of claim 17, wherein the procedure and the second procedure at least partially overlap in time.

19. The apparatus of claim 17, wherein the logic is operable to:
update, based at least in part on determining the buffer for the procedure, the flag for the buffer to indicate that the buffer is unavailable, wherein the second buffer is selected based at least in part on the flag for the buffer indicating that the buffer is unavailable.

20. A method performed by a memory device, the method comprising:
determining to perform an eviction procedure for a bank of a volatile memory that operates as a cache for a non-volatile memory, wherein the eviction procedure saves data from the bank of the volatile memory to the non-volatile memory;
determining an activity status for at least one buffer in a pool of buffers coupled with the volatile memory and the non-volatile memory; and
selecting a buffer from the pool of buffers for the eviction procedure for the bank of the volatile memory based at least in part on the activity status for that buffer.

21. The method of claim 20, further comprising:
referencing a set of bits that indicates activity statuses for the pool of buffers; and
determining the activity status for the buffer based at least in part on a bit for the buffer in the set of bits.

22. The method of claim 21, wherein the bit for the buffer indicates that the buffer is inactive, the method further comprising:
updating, based at least in part on selecting the buffer for the eviction procedure, the bit for the buffer to indicate that the buffer is busy based at least in part on the eviction procedure.

23. The method of claim 20, further comprising:
updating, based at least in part on selecting the buffer for the eviction procedure, the activity status for the buffer to indicate that the buffer is busy based at least in part the eviction procedure;
performing the eviction procedure for the bank of the volatile memory using the selected buffer; and
updating, based at least in part on completing the eviction procedure, the activity status for the buffer to indicate that the buffer is inactive.

24. The method of claim 23, further comprising:
determining to perform a second eviction procedure for a second bank of the volatile memory, wherein the second eviction procedure comprises saving second data from the second bank of the volatile memory to the non-volatile memory; and
selecting the buffer for the second eviction procedure for the second bank of the volatile memory based at least in part on the activity status for the buffer indicating that the buffer is inactive.

25. The method of claim 20, further comprising:
determining that a second buffer from the pool of buffers is busy based at least in part on a second eviction procedure, wherein the buffer is selected based at least in part on the second buffer being busy.

* * * * *